US012695845B1

(12) United States Patent (10) Patent No.: US 12,695,845 B1
Burlina et al. (45) Date of Patent: Jul. 28, 2026

(54) GENERATION OF THERMAL IMAGES FROM VISIBLE IMAGES

(71) Applicant: Zoox, Inc., Foster City, CA (US)

(72) Inventors: Philippe Martin Burlina, Rockville, MD (US); Subhasis Das, San Mateo, CA (US); Marianna Hajar Neubauer, Seattle, WA (US); Yu Hsin Chang, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 330 days.

(21) Appl. No.: 18/385,629

(22) Filed: Oct. 31, 2023

(51) Int. Cl.
H04N 5/30 (2006.01)
G06T 7/11 (2017.01)
G06T 7/215 (2017.01)

(52) U.S. Cl.
CPC .................. H04N 5/30 (2013.01); G06T 7/11 (2017.01); G06T 7/215 (2017.01); G06T 2207/10024 (2013.01); G06T 2207/20081 (2013.01); G06T 2207/20084 (2013.01)

(58) Field of Classification Search
CPC .. H04N 5/30; G06T 7/11; G06T 7/215; G06T 2207/10024; G06T 2207/20081; G06T 2207/20084
See application file for complete search history.

(56) References Cited

U.S. PATENT DOCUMENTS

| | | | |
|---|---|---|---|
| 11,392,134 B1 * | 7/2022 | Ferdowsi | G01J 5/06 |
| 11,397,439 B1 * | 7/2022 | Ferdowsi | G01S 17/00 |
| 2021/0108966 A1 * | 4/2021 | Kuepper | G06V 20/56 |
| 2022/0164969 A1 * | 5/2022 | Price | G06T 7/593 |

* cited by examiner

*Primary Examiner* — Bobbak Safaipour
(74) *Attorney, Agent, or Firm* — Lee & Hayes, P.C.

(57) ABSTRACT

Techniques for generating image data of a modality different from a visible light modality are discussed herein. For example, visible light images may be readily available for training and testing vehicle systems, but corresponding image data of a thermal modality may not be available. In examples, one or more trained machine learning (ML) models may be used to generate synthetic thermal images based on an input visible light image. Such ML models may be trained, based on a training dataset including metadata and semantic segmentation associated with visible light images, to determine an appearance of the output synthetic thermal images. In some examples, an emittance level of regions of the synthetic thermal image may be further adjusted based on information associated with the respective region. The synthetic thermal images may be used for simulation and training of vehicle systems to interpret thermal imagery.

20 Claims, 6 Drawing Sheets

500

600 ⤵

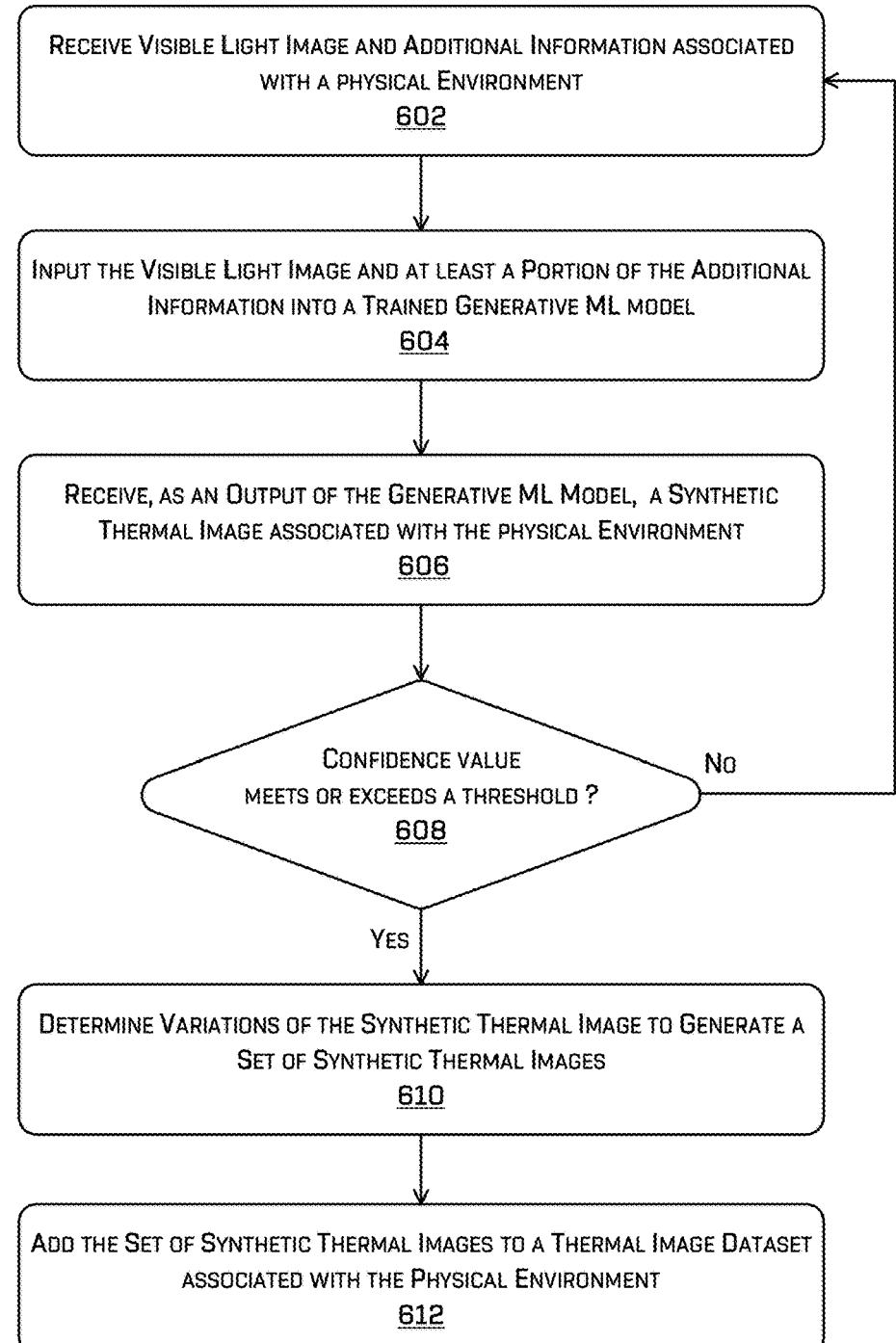

RECEIVE VISIBLE LIGHT IMAGE AND ADDITIONAL INFORMATION ASSOCIATED
WITH A PHYSICAL ENVIRONMENT
602

INPUT THE VISIBLE LIGHT IMAGE AND AT LEAST A PORTION OF THE ADDITIONAL
INFORMATION INTO A TRAINED GENERATIVE ML MODEL
604

RECEIVE, AS AN OUTPUT OF THE GENERATIVE ML MODEL, A SYNTHETIC
THERMAL IMAGE ASSOCIATED WITH THE PHYSICAL ENVIRONMENT
606

CONFIDENCE VALUE
MEETS OR EXCEEDS A THRESHOLD ?
608

No

YES

DETERMINE VARIATIONS OF THE SYNTHETIC THERMAL IMAGE TO GENERATE A
SET OF SYNTHETIC THERMAL IMAGES
610

ADD THE SET OF SYNTHETIC THERMAL IMAGES TO A THERMAL IMAGE DATASET
ASSOCIATED WITH THE PHYSICAL ENVIRONMENT
612

FIG. 6

GENERATION OF THERMAL IMAGES FROM VISIBLE IMAGES

BACKGROUND

Safe operation of an autonomous vehicle is often predicated on an understanding of an environment around the vehicle, including various objects in the environment. An autonomous vehicle may include multiple sensors and various systems for detecting and tracking objects surrounding the autonomous vehicle and may take these objects into account when controlling the vehicle. In some instances, such as at night or during poor weather conditions, the objects may be easier to detect in thermal images of the scene rather than visible light images. Training and simulation of systems using thermal images is hampered by limited availability of datasets for such images as compared to visible light images.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 illustrates an example process for generating synthetic thermal images using a trained generative machine learning model, as described herein.

DETAILED DESCRIPTION

Figure 1:
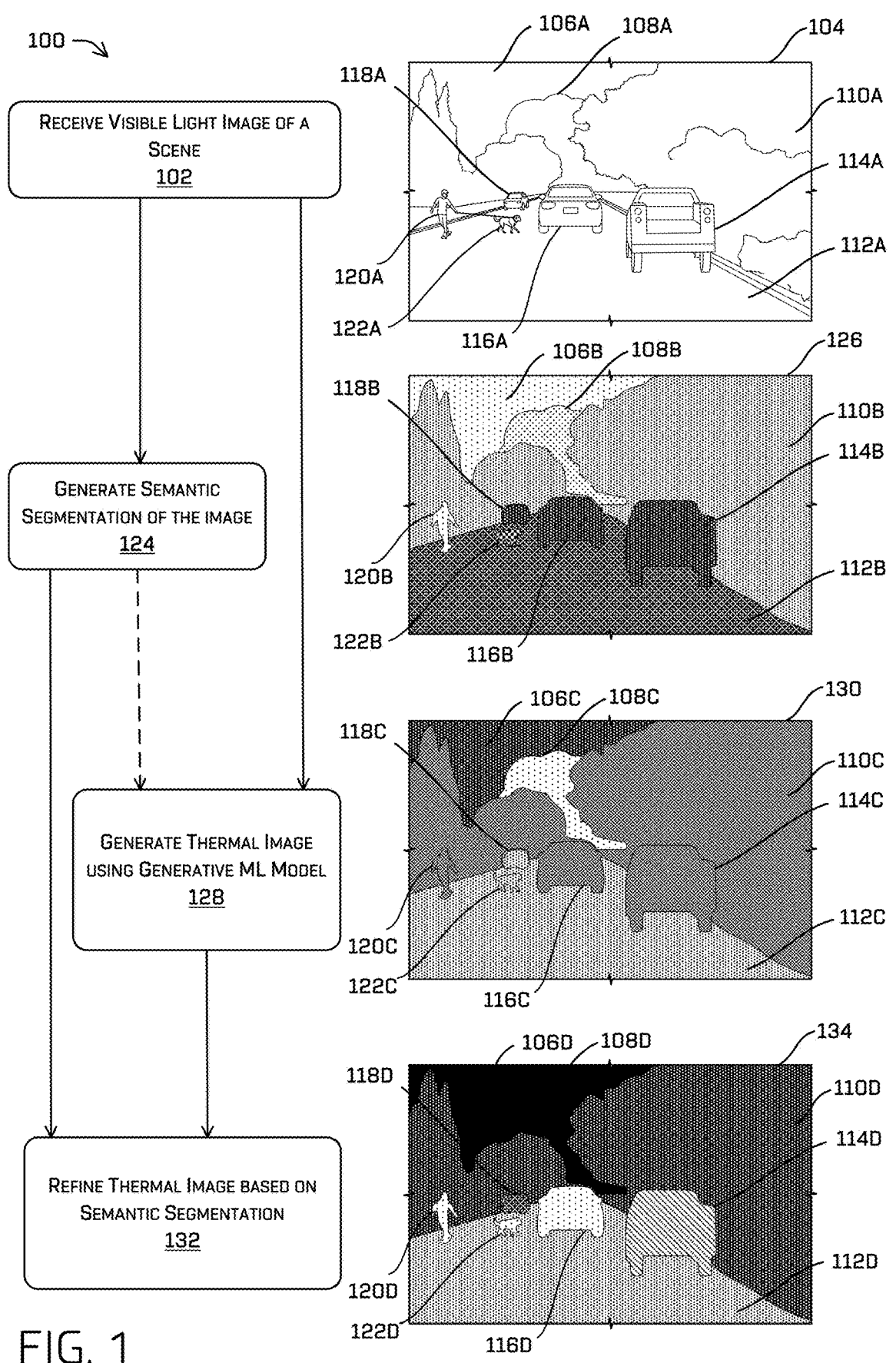
FIG. 1 includes textual and visual flowcharts to illustrate an example method for generating a thermal image from a visible light image, as described herein.

Techniques described herein are directed to generation of thermal images or infrared (IR) images, including long-wave infrared (LWIR), short-wave infrared (SWIR), or the like, from visible light images of an environment. As discussed herein, autonomous vehicles may navigate through physical environments by relying on multiple sensors to provide input to a perception system to detect objects in the environment surrounding the vehicle. These objects may be stationary and/or permanent objects in the environment, such as vegetation, road surface, sky, buildings, road signs, etc., or dynamic objects such as vehicles, pedestrians, animals, etc. The autonomous vehicles may utilize sensor data from the multiple sensor modalities to detect, classify, and track the objects in the environment. Synthetic thermal images generated from visible light images of the environment may be used for training vehicle systems to sense objects using data from infrared sensors. In some examples, the synthetic thermal images may be utilized in a simulated environment for tuning parameters and testing the performance of the vehicle systems on thermal imagery.

In examples, thermal sensors may be more suitable than other sensor modalities for detecting some types of objects and/or objects in some environmental conditions. As an example, a live animal or a pedestrian may be difficult to detect in a visible light image due to their small size and presence of background clutter in the image, but may be easier to detect in a thermal image e.g., an LWIR image, due to their higher body temperature than ambient temperatures. As another example, a dark-colored vehicle may be difficult to detect in a visible light image captured at night or under poor weather conditions, but if its engine is running, at least a portion of the vehicle corresponding to the engine may appear brighter in a thermal image due to its higher temperature. In some examples, the vehicle systems may use sensor data from sensors of multiple modalities (e.g., visible light image, light detection and ranging (LiDAR) data, radio detection and ranging (RADAR) data, etc.) in combination (e.g., using sensor fusion techniques) with thermal images to detect objects in the environment with higher accuracy than is possible from sensor data of a single modality.

To utilize advantageous features of thermal images discussed above, the vehicle systems, such as a perception system or a prediction system, may implement techniques to process thermal images for detecting/classifying different types of objects and/or interpreting behaviors of objects in the environment. As an example, the vehicle systems may use trained machine learning (ML) models to perform object detection/classification tasks in thermal images. However, large and diverse labeled thermal image datasets may not be readily available for use as training data for training such ML models. Whereas, training datasets of visible light images labeled with objects present in the images and/or other semantic annotations may be more readily available.

In examples, the datasets of visible light images may include annotations identifying region(s) in the images corresponding to specific object(s), as well as label(s) indicating an object type associated with the object(s) (e.g., a semantic classification of an object as an animal, pedestrian, car, etc.). These labels and annotations may generally be referred to as "ground truth," and may include any combination of manual entries (e.g., by a human operator) and/or automatically generated entries (e.g., using digital image understanding techniques). In addition, visible light images may be easily acquired in the real world with a generic camera or other imaging device, as well as easily interpreted by a human who may associate the images with ground truth indicating areas corresponding to objects along with respective object types (e.g., semantic labels).

In some examples, parameters of the vehicle systems may be tuned or tested within a simulation e.g., by a vehicle simulator in a virtual environment. Such simulation may need thermal images illustrating various objects under various environmental conditions corresponding to road scenes within the virtual environment. Generation of synthetic thermal images within the simulated environment, e.g., using physics-based techniques, may be difficult because these techniques require complex modeling of thermal emission and absorption characteristics of a variety of materials under various environmental conditions. However, synthetic visible light images may be more easily generated within the simulated virtual environment, e.g., using ray tracing techniques, based on known three-dimensional (3D) object models within the virtual environment.

Some of the techniques described herein are directed to generating synthetic thermal images from visible light images, which are easier to acquire as discussed above, to create datasets of thermal images, paired data (e.g., thermal images and corresponding visible light images of same scene), and/or fused data (e.g., including thermal and visible light components), suitable for training and simulation of vehicle systems using thermal imagery. In examples of the present disclosure, the synthetic thermal image may not be a realistic rendition matching a respective real thermal image, and instead, the techniques described herein may aim to improve fidelity with the real thermal image in regions that are important for controlling operations of the autonomous vehicle traversing the scene. For example, the techniques described herein may target regions corresponding to objects typically encountered in a road scene, particularly those objects that the autonomous vehicle may need to take into account for navigating the environment.

In some examples, the techniques described herein may generate the thermal images from visible light images by using generative machine learning (ML) models such as generative adversarial networks (GANs), variational auto-encoders (VAEs), diffusion models, visual transformer(s) such as Image GPT, recursive neural network (RNN), and the like. In some examples, training datasets for training such generative ML models may include "paired" or "companion" data e.g., two or more modalities of data corresponding to a same scene and captured at a same time or a time close to each other (e.g., which may be captured during driving operations by sensors mounted on vehicles) and/or illustrate typical road scenes. Techniques for generating synthetic images of different modalities (including thermal images) are described in U.S. patent application Ser. No. 18/123,146, filed Mar. 17, 2023, titled "Training of Multi-Modality Object Detectors," which is hereby incorporated by reference in its entirety and for all purposes.

As an example, the synthetic thermal images may be generated from visible light images using a style transfer network, comprising a trained generative ML model implementing a neural style transfer (NST) technique. For example, the NST technique can be used to generate an output similar in appearance to a style of a reference image, while using content from an input image of a different style. Such a network may be configured to generate, as output, corresponding data of a second modality when provided input data of a first modality. For example, in an infrared or thermal image which is typically a greyscale image (e.g., comprising pixel intensity values in a range, such as 0 to 255), sky and vegetation appear darker than road surfaces, while warm objects such as animals, running cars, etc., appear bright. This appearance may be applied to an input image (e.g., an RGB visible light image) to generate a corresponding output image containing the same elements (e.g., sky, road, vegetation, objects, etc.) as the input image, but with an appearance (e.g., a look-and-feel) of an infrared image.

In some examples, the style transfer network may be trained with paired data and/or unpaired data (e.g., data of two modalities that do not correspond to the same scene) of the first modality (e.g., RGB images) and the second modality (e.g., thermal image). In some examples, the training data for such a style transfer network may be from any source, and may depict scenes that are not restricted to road scenes (e.g., may include scenes from nature including vegetation and/or animals). In a non-limiting example, the style transfer network may comprise a fully convolutional network (FCN) trained using paired data inputs of the first modality (e.g., RGB image) and corresponding target outputs of the second modality (e.g., thermal image).

In some examples, paired data (e.g., a visible light image and its corresponding thermal image) may not be available in real-world scenarios. In such examples, generative ML models such as Cycle-based Neural Style Transfer models (or CycleGANs) trained on unpaired data (e.g., visible light images and thermal images depicting different scenes) may be used to generate thermal images from visible light image(s). For example, such cycle-based models may include a generator network for outputting a thermal image, and a discriminator network outputting an indication of whether the thermal image generated by the generator network appears to be a thermal image, the output of the discriminator network being provided as feedback to further train the generator network to improve its output.

In examples, because the generative ML models merely mimic an overall look-and-feel, but do not interpret an input image semantically, the synthetic thermal images generated by such models, especially those ML models trained on unpaired data, may exhibit several errors and artifacts when compared with real thermal images captured by actual infrared sensors e.g., sensors mounted on a vehicle traversing the environment. Therefore, such synthetic thermal images may not provide an ideal dataset for training and simulation of the vehicle systems for operation in the real world. The techniques described herein include refinement of machine-generated thermal images using additional information about a scene depicted in the thermal image. In examples, the additional information may include segmentation, object detection and/or object classification, optical flow computation, and the like.

For example, the techniques described herein may include one or more algorithms configured to segment, detect, classify, and/or label objects in an input visible light image from which a corresponding synthetic thermal image is to be generated. The one or more algorithms may comprise ML model(s), such as a convolutional neural network (CNN), a Recurrent Neural Network (RNN), a graph neural network (GNN), a fully convolutional network (FCN) and the like, trained to classify objects in an input visible light image, panoptic segmentation techniques which determine segments corresponding to specific instances of object(s) in the visible light image in conjunction with determining a semantic label for the object(s), and/or image processing techniques (e.g., edge detection, segmentation based on uniformity of color and/or texture, clustering, etc.) for image segmentation. In examples where the input visible light image is generated by a simulator in a virtual environment, the simulator may provide a perfect panoptic segmentation of the image based on known 3D models of objects in the environment. A semantic segmentation of the visible light image may include identification of regions in the image corresponding to objects and a respective object type of the objects, as discussed above.

In examples, the techniques described herein may include refining the synthetic thermal image generated by a generative ML model, based at least in part on the semantic segmentation information of an input visible light image. For example, emittance levels (e.g., apparent brightness or greyscale value) of regions in the synthetic thermal image may be adjusted based on the object type indicated in the segmented image for the respective region, since specific object types are associated with known thermal characteristics. For example, a region associated with an object type "sky" may be adjusted to be darker based on an expected thermal emittance level for sky, and regions corresponding to an object type of "human" or "animal," may be adjusted to be brighter based on an expected thermal emittance level for living mammals. As another example, a thermal emittance level of a region associated with an object type "car" may be adjusted based on a location of the region with respect to a region associated with a road surface e.g., regions associated with the object type "car" that are centrally located on the road surface may be adjusted to appear brighter as their engines are likely to be running, whereas regions associated with the object type "car" located at curb sides of the road surface may correspond to parked cars, and may be adjusted to appear darker.

In some examples, the input visible light image may be associated with capture metadata indicating capture date and time, geo-location, environmental conditions, and the like. In some examples, the visible light image may be captured by a camera which may be mounted on a vehicle traversing the environment. In such examples, the capture metadata may also include information from other vehicle components at the time of capture, such as outside temperature, wiper use, fog light, headlight or high beam light use, anti-lock braking system (ABS) activation, and the like, indicative of the environmental conditions. Further, in such examples, the capture metadata may include information from vehicle computing systems, such as a perception system or a prediction system, indicating tracked objects or blobs in the scene, including a speed of motion, a trajectory or path of motion, uniformity of direction and speed, a confidence score, and the like, associated with the tracked objects or blobs.

In some examples, the techniques described herein may further refine the synthetic thermal image based on the capture metadata. For example, an appearance of the sky region(s) may be adjusted based on a time of day (corresponding to an angle of the sun) indicated in the capture metadata. As another example, an expected ambient temperature may be determined based on the time of day and date (corresponding to a season) of the year and geo-location, and regions corresponding to road surfaces, vegetation, and parked vehicles may be adjusted based on the expected ambient temperature. In some examples, weather conditions such as temperature, type of precipitation if any, degree of precipitation, whether sunny or cloudy, degree of visibility, and the like, may be available from a weather service for a given time and geo-location at the time of capture. The techniques described herein may adjust an apparent brightness of regions corresponding to different object types based on expected thermal emittances of the respective object type under the environmental conditions during capture.

In some examples, the techniques described herein may also use motion information associated with regions e.g., as determined from optic flow or available from tracking information maintained by vehicle systems. In examples, motion information may be used to determine if vehicles are moving and/or an animal is alive, and therefore, have a higher expected thermal emittance. In examples where the visible light image is generated within a simulated environment, capture metadata and motion information may be provided by the simulator based on parameters of the simulation.

In some examples, the techniques described herein may provide information related to an input visible light image as additional input prompts to generator ML models, such as diffusion models, to generate a synthetic thermal image in accordance with the input prompts. As non-limiting examples, such inputs may include a semantic segmentation of the visible light image indicating regions corresponding to objects and/or semantic labels identifying respective object types. The additional information may also include environmental conditions, such as time of day, temperature, weather condition(s), etc. As discussed above, these factors may affect an appearance of a thermal image, and providing the additional information during a training phase of the generator ML model may enable the generator ML model to learn associations between the additional information and adjustments to the appearance of the thermal image generated as output of the ML model.

For example, sufficient number of examples of visible light images corresponding to road scenes depicting rare occurrences may not be available. For example, visible light images depicting a specific type of animal crossing a street, a specific type of debris in a specific area of a scene, a human sitting or laying on the road surface, a stroller on the road, and the like may not be available. In addition, visible light images corresponding to road scenes in specific weather conditions (e.g., foggy, snowy, rainy, etc.) and/or time of day (e.g., sun at low angle, twilight, night, etc.) may not be available. In some examples, synthetic thermal images may be generated utilizing generative ML models (e.g., diffusion models) that are configured to generate images in response to input prompts (e.g., Stable Diffusion, DALL-E, Fotor, etc.) to address inadequacies in availability of such images. For example, the techniques described herein may provide a real or synthetic visible light image in conjunction with input prompts such as segmentation information, environmental conditions, and/or text prompts to the generative ML models to obtain, as output, a synthetic thermal image based on the input prompts. For example, such generative ML models may be used to generate thermal images of scenes incorporating various objects and/or under various environmental conditions, that may not be easy to acquire in the real world.

In various examples, a combination of using a generative ML model to generate a synthetic thermal image based on input prompts, and refinement of a synthetic thermal images (e.g., after generation by a generative ML model) may be implemented. For example, some information may be provided as input prompts to the generative ML model, and additional information may be used for refining the synthetic thermal image output by the generator ML model.

In some examples, additional thermal images may be generated by using data augmentation techniques on a single thermal image. For example, the synthetic thermal image generated by the generator ML model (or a thermal image generated by a thermal imager) may be modified slightly in various ways e.g., by adding small rotations, scaling, shifts, mirroring, and the like. In addition, a first set of adjustments may be applied to region(s) corresponding to specific object types to create additional thermal images. For example, a region corresponding to a "vehicle" label may be adjusted to different brightness levels, which may represent a vehicle with its engine running, a vehicle with its engine partially cooled down, a vehicle with a cold engine, or the like. As other examples, a second set of adjustments may be applied to regions corresponding to a "sky" label to generate additional thermal images illustrating appearances of the sky based on an angle of the sun, and a third set of adjustments may be applied to regions corresponding to a "road surface" label to generate appearance of the road surface in different ambient temperature conditions. A combination of various adjustments may be applied to generate a large number of additional thermal images from a single thermal image. In some examples, techniques such as Neural Radiance Field (NeRF) may be used to generate additional thermal images of a scene as viewed from different viewpoints.

As discussed, the vehicle systems may be trained based on training datasets which may include synthetic thermal images, to determine various characteristics of object(s) in the surroundings of the vehicle based on thermal imagery. Techniques for determining object characteristics in thermal images and controlling the vehicle based on such determination is described in U.S. Pat. No. 11,780,471 issued on Oct. 10, 2023, titled "System for Determining a State of an Object using Thermal Data," which is hereby incorporated by reference in its entirety and for all purposes. Example operations to control the vehicle may include, but are not limited to, a safe stop, an emergency stop, determining a trajectory to avoid the object(s), determining a trajectory to avoid a predicted location of the object, or the like. Additional operations based on the presence of the object may include prediction operations e.g., the object may be tracked to determine its trajectory over time. As discussed, using thermal images may provide previously-unavailable characterization of object(s), such as whether an animal is alive, a vehicle has its engine on, a pedestrian is running, and the like. The vehicle computing systems may determine an action for the autonomous vehicle to take based on location, classification, and/or characteristics of the detected object. In some examples, using the techniques described herein may improve safe operation of the vehicle by characterizing the object with greater detail and accuracy as compared to models based on single modality of images.

Although several aspects of this disclosure are described in connection with the use of images, including thermal images, to control autonomous vehicles, this disclosure is not limited to autonomous vehicles. Many systems may benefit from the use of images generated according to techniques described herein. Additional aspects of this disclosure now will be described with specific reference to the figures.

FIGS. 1-6 provide additional details associated with techniques described herein. More specifically, FIG. 1 includes textual and visual flowcharts to illustrate an example process 100 for generating a synthetic thermal image corresponding to a visible light image. In examples of this disclosure, a synthetic image refers to a machine-generated image that is not captured by actual sensors in the real world, or generated from physics-based modeling and simulation in a virtual environment. Such synthetic images may instead be generated by generative ML model(s) based on inputs which may include other images, text prompts, metadata, and other information guiding an output of generative ML model(s).

At an operation 102, the process 100 includes receiving a visible light image 104 of a scene. In some examples described herein, the visible light image 104 may have been captured by a camera mounted on a vehicle traversing an environment during vehicle operations. In some examples, a real visible light image captured by the camera mounted on the vehicle may be transformed, using extrinsic and/or intrinsic parameters of the camera and known infrared sensors, to emulate a perspective of a thermal image that would have been captured by the infrared sensors.

In other examples, the visible light image may be partially or completely synthetic (e.g., generated by a generative ML model). For example, a partially or completely synthetic image based on user-provided prompts may be generated as described in U.S. patent application Ser. No. 18/123,146, filed Mar. 17, 2023, titled "Training of Multi-Modality Object Detectors," which is incorporated herein by reference, as noted above. As an example, an adequate number of visible light images may not be available corresponding to rare occurrences in the real world (e.g., images depicting a specific type of animal crossing a street, a specific type of debris in a specific area of a scene, a person exiting a car parked at a curb of the road, or the like). In some examples, such images may be generated by utilizing generative ML model(s) that are configured to generate images in response to text prompts (e.g., Stable Diffusion, DALL-E, Fotor, etc.). In other examples, partially synthetic images may be generated. For example, the image 104 may comprise an actual road scene captured by a camera, with an addition of objects (e.g., an animal, a human, a vehicle, etc.). In examples, the objects may be indicated in text prompts provided as inputs to the generative ML model(s).

In some examples, the visible light image 104 may be a synthetic visible light image generated within a simulated virtual environment, e.g., using ray tracing techniques, based on known three-dimensional (3D) object models within the virtual environment. In some examples, the synthetic visible light image 104 may be generated from a perspective of infrared sensors as mounted on a simulated vehicle during simulated traversal of the virtual environment.

In examples, the image 104 may be received in one of various image formats such as .jpg, .bmp, .tiff, .heic, etc. In some examples, the image 104 may comprise a visible light video capture of the scene, received in video formats such as .mov, .wav, .mp3/4, mpeg, avi, etc. In some examples, keyframes may be extracted from video capture of the scene, and the image 104 may correspond to a keyframe extracted from the video capture.

In examples, the image 104 may also include metadata associated with the image 104. For example, the metadata can include "capture metadata," which may include a capture time and/or date, a geo-location associated with the capture, an identification of frame number (if extracted from a video capture), or the like. In some examples, the metadata may include environmental information (e.g., temperature, humidity, precipitation, visibility, etc.) at the time of image capture from other sensors (e.g., mounted on the same vehicle as the camera capturing the image 104). In some examples, the metadata may also or alternatively include information from other vehicle components at the time of capture, such as wiper use, fog light, headlight or high beam light use, anti-lock braking system (ABS) activation, and the like. Further, in some examples, the metadata may include information from vehicle computational systems, such as a perception system or a prediction system, indicating tracked objects or blobs in the scene, including a speed of motion, a trajectory or path of motion, uniformity of direction and speed, a confidence score, and the like, associated with the tracked objects or blobs.

In examples where the image 104 is partially or completely synthetic (e.g., machine-generated), the capture metadata associated with the image 104 may include parameters used for synthesizing the image 104. These parameters can include characteristics of a simulated environment providing the scene such as weather conditions, angle of sun, location, and the like; prompts provided to the generative ML model(s); metadata corresponding to a background road scene (if the image 104 is partially synthetic), or other parameters.

As illustrated in FIG. 1, the image 104 represents a road scene depicting a portion of an environment in which an autonomous vehicle may operate. The image 104 depicts various elements commonly encountered in such a road scene, including natural elements such as sky 106A, clouds 108A, and vegetation 110A; permanent objects such as a road surface 112A and buildings (not shown); and/or transient objects such as vehicles 114A, 116A, 118A, a human 120A (e.g., a dog walker), and an animal 122A (e.g., a dog). The vehicles 114A and 118A are shown at curb sides of the road surface 112A, where vehicle 114A may have just pulled over to the curb and has its engine still running, whereas vehicle 118A may be parked for a significant duration with its engine turned off. The vehicle 116A may be actively traversing the road surface 112A. As can be understood, the image 104 may include one or more of various other objects, such as buildings, road signs, other vehicles, larger animals such as deer or cattle, strollers, shopping carts, or any other object that may be appear in road scenes.

At an operation 124, the process 100 includes generating a segmented image 126 representing a semantic segmentation of the image 104. The segmented image 126 may indicate blobs or other subsets of pixels corresponding to the various elements depicted in the image 104. For example, a blob 106B corresponds to the sky 106A, a blob 108B corresponds to the clouds 108A, a blob 110B corresponds to the vegetation 110A, a blob 112B corresponds to the road surface 112A, blobs 114B, 116B, 118B correspond to the vehicles 114A, 116A, 118A, respectively, a blob 120B corresponds to the human 120A, and a blob 122B corresponds to the animal 122A. The segmented image 126 may also include a semantic label corresponding to each blob indicating a classification of the respective blob. For example, the classification may identify an object type e.g., sky, vegetation, building, vehicle, human, animal, road surface, etc.

In examples, the operation 124 may include implementing one or more algorithms configured to segment, detect, classify, and/or label objects in the image 104. For example, the process 100 may generate the segmented image 126 using ML model(s), such as a convolutional neural network (CNN), a Recurrent Neural Network (RNN), a graph neural network (GNN), a fully convolutional network (FCN) and the like, to segment and/or semantically classify detected segments. In some examples, separate ML model(s) may be trained to identify each object type of a set of object types, with each ML model generating an output indicative of presence of an object of the respective object type and/or its location in input image(s), along with a confidence score. In other examples, the ML model(s) may output a probability score at each pixel location of the input image(s) representing a probability of the pixel location corresponding to each object type of the set of object types. Additionally, in some examples, the ML model(s) may output an output image, such as the segmented image 126, corresponding to the input image(s), the output image indicating a region or location corresponding to object(s) of specified object type(s).

In some examples, the process 100 may determine segments in the visible light image 104 in conjunction with determining a semantic label corresponding to the segment using panoptic segmentation techniques (which may use a Feature Pyramid Network (FPN), attention-guided unified network, and the like). An output of such techniques includes, for each pixel of an input image, a semantic label indicating an object type and an instance identifier indicating a specific instance of the object type. In examples where the visible light image 104 is generated by a simulator in a virtual environment, the simulator may provide, as the segmented image 126, a perfect panoptic segmentation of the image 104, as an extent of each element in the scene is accurately modeled in the virtual environment.

In some examples, the process 100, e.g., at the operation 124, may determine segments in the visible light image 104 based on image processing techniques (e.g., edge detection, segmentation based on uniformity of color and/or texture, clustering, etc.) and classify the detected segments using ML model(s) to identify object types corresponding to the detected segments. In some examples, a combination of manual segmentation and/or annotations, and automatic algorithms may be used to generate the segmented image 126. As non-limiting examples, segments of the segmented image 126 may be labeled with semantic labels such as "sky," "vegetation," "road surface," "human," "animal," "vehicle," "building," and the like. In some examples, the semantic labels may include further detail within broader categories, such as "human" may further include an activity-related label (e.g., "pedestrian," "skateboarder," "dog walker," "bicyclist," etc.), "animal" may further include a specific type of animal (e.g., "dog," "deer," "cat," etc.) and "vehicle" may include further categorization based on type of vehicle and/or motion status (e.g., "parked vehicle," "traveling vehicle," "car," "truck," etc.).

In examples, the ML model(s) used in the operation 124 for segmentation and/or classification may be trained on training data comprising input images. Such input images may be annotated with expected segments and corresponding semantic labels indicating object types for those segments. An appropriate dataset to train the ML model(s) may include a large quantity of input images (e.g., hundreds of thousands) with known, or previously determined, regions or segments corresponding to objects of interest depicted in a wide variety of relevant backgrounds (e.g., road scenes). It should be noted that large training datasets depicting common objects in visible light images (e.g., RGB images) are publicly available (e.g., ImageNet, COCO, PASCAL VOC, KITTI, etc.), and may be used for training the ML model(s).

In some examples, the one or more algorithms for generating the semantic segmentation of the image at the operation 124 may be implemented on a remote computing system(s), separate from computing system(s) implementing the process 100. In such examples, the process 100 may also receive the segmented image 126 along with the visible light image 104 at the operation 102.

At an operation 128, the process 100 includes generating a synthetic thermal image 130 from the image 104 using a generative ML model implementing a neural style transfer (NST) technique. The NST technique can be used to generate an output similar in appearance to a style in a reference image, while using content from an input image of a different style than the reference image. For example, in a thermal image, sky and vegetation appear dark, while warmer objects, such as animals, running cars, and the like, appear bright (e.g., have a higher intensity or greyscale value). This appearance may be applied to an input image (which may be an RGB, visible light image) to generate a corresponding output image containing the same elements (e.g., sky, road, vegetation, objects, etc.) as the input image, but with an appearance (e.g., a look-and-feel) of a thermal image. Such a generative ML model may be trained with paired data and/or unpaired data (e.g., data that do not correspond to the same scene) of the first modality (e.g., RGB image) and the second modality (e.g., thermal image). In some examples, the training data may not be restricted to road scenes, and may comprise any outdoor scenes (e.g., scenes from nature including vegetation and/or animals). As used herein, a "synthetic" thermal image (such as the image 130) may be any machine-generated thermal image. Such a synthetic thermal image may be distinct from a real thermal image of a scene as captured by actual infrared sensors (e.g., infrared sensors mounted on a vehicle viewing the scene), at least because the synthetic thermal image may include differences when compared with the real thermal image, as discussed below.

As a non-limiting example, the process 100 may use, at the operation 128, a generative ML model trained to generate, from an input data of a first modality (e.g., visible light image), corresponding data of a second modality (e.g., thermal image) different from the first modality. In a non-limiting example, such a generative model may comprise a fully convolutional network (FCN) trained using inputs of the first modality (e.g., visible light image) and corresponding target outputs of the second modality (e.g., thermal image). For example, an FCN may be trained with visible light images as inputs, and corresponding paired thermal images as target outputs. Such an FCN, after training, may be used to generate a corresponding thermal image when provided a visible light image as input. In examples, paired thermal images may be obtained by transforming thermal images captured simultaneously, or nearly simultaneously, with corresponding visible light images to align the thermal images with the visible light images based on intrinsic and extrinsic parameters of the infrared and visible light sensors e.g., relative position of the sensors on the vehicle, focus and zoom parameters of the sensors, resolution of the sensors, and the like.

As another example, the process 100, at the operation 128, may use generative ML models such as Cycle-based Neural Style Transfer models (or CycleGANs) trained on unpaired data (e.g., visible light images and thermal images depicting different scenes) to generate thermal images from visible light image(s). For example, such cycle-based models may include a generator network for outputting a thermal image, and a discriminator network outputting an indication of whether the thermal image generated by the generator network appears to be a thermal image, the output of the discriminator network being provided as feedback to further train the generator network to improve its output. Further techniques for generating images of a second modality from images of a first modality are described in U.S. patent application Ser. No. 18/123,146, filed Mar. 17, 2023, titled "Training of Multi-Modality Object Detectors," which is incorporated herein by reference, as noted above.

Figure 3:
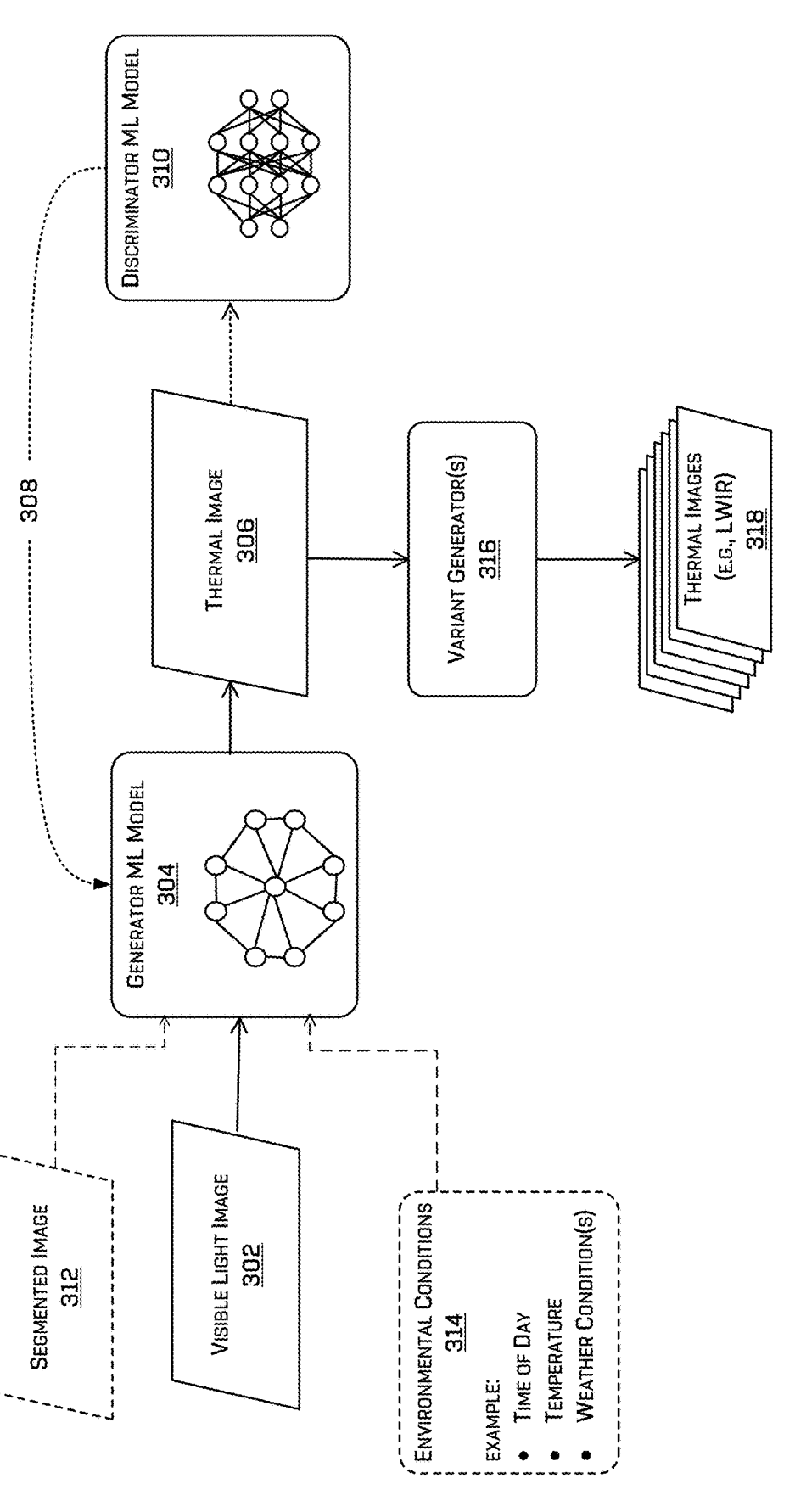
FIG. 3 illustrates an example process for generating thermal image(s) from a visible light image and additional information, as described herein.

In some examples, the process 100 may, at the operation 128, also provide the segmented image 126 and/or the capture metadata associated with the image 104 as additional information to the generative ML model(s) to guide appearance of regions in the synthetic thermal image 130 generated as output, as discussed further with reference to FIG. 3.

As illustrated, the synthetic thermal image 130 may include the same scene as depicted in the visible light image 104, but with a look-and-feel of an image captured in infrared wavelengths e.g., a greyscale or intensity image with black sky areas, light grey (e.g., medium intensity value) road surfaces, some bright (e.g., high intensity value) objects etc. For example, the synthetic thermal image 130, as generated by the ML model at the operation 128, may depict a region 106C corresponding to the sky 106A, region 108C corresponding to the clouds 108A, region 110C corresponding to the vegetation 110A, region 112C corresponding to the road surface 112A, region 114C, 116C, 118C corresponding to the vehicles 114A, 116A, 118A respectively, region 120C corresponding to the human 120A, and region 122C corresponding to the animal 122A.

In examples, synthetic thermal images (such as the image 130), especially those generated by ML models trained on unpaired data, may typically include several errors and artifacts when compared with real thermal images of a scene as captured by actual infrared sensors e.g., infrared sensors mounted on a vehicle viewing the scene. For example, though the image 130 may exhibit a look-and-feel of a thermal image, there are several differences with a real thermal image of the scene. As examples, in a real thermal image, there may be no distinction between the region 106C corresponding to the sky 106A and the region 108C corresponding to the clouds 108A; the region 120C corresponding to the human 120A and the region 122C corresponding to the animal 122A would appear significantly brighter than the regions corresponding to the vegetation 110C or the road surface 112C due to their warmer body temperatures; the region 116C corresponding to the vehicle 116A which is actively traveling would appear much brighter than its surroundings due to heat generated by its engine, and the region 118C corresponding to the parked vehicle 118A would appear dark since the vehicle 118A is not warmer than its surroundings. The region 114C corresponding to the vehicle 114A that has just pulled over (e.g., engine has not cooled down yet) may be brighter in comparison to the region 118C. In some examples, due to the potential artifacts and errors, the synthetic thermal image 130 may not provide accurate cues suitable for training and simulation of the vehicle systems for operation in the real world based on real thermal imagery.

At an operation 132, the process 100 may include refining the synthetic thermal image 130 based at least in part on the semantic segmentation information present in the segmented image 126 to generate a refined thermal image 134. In examples, the process 100 may adjust emittance levels (e.g., apparent brightness) of the regions 106C-122C based on the object type indicated in the segmented image 126 and known thermal characteristics corresponding to the object types. For example, as illustrated in the refined thermal image 134, the regions 106D and 108D, corresponding to the blobs 106B and 108D with semantic labels "sky" and "cloud," may both be adjusted to be darker based on an expected brightness level for sky, and the regions 120D and 122D, corresponding to the blob 120B labeled as "human" and the blob 122B labeled as an "animal," may be adjusted to be brighter based on an expected brightness level for living mammals. As another example, the region 116D corresponding to the blob 116B labeled "car" may be adjusted to be brighter based on an expected brightness level for cars with a running engine. In some examples, the process 100 may use additional information, such as tracking information of surrounding objects maintained by a vehicle, optic flow determined from video feed, a placement of the blob 116B on the blob 112B corresponding to the road surface, and the like, to distinguish between regions corresponding to a vehicle traveling on the road surface and a parked vehicle, as discussed further with reference to FIG. 2. In some examples, the process 100 may also take into account other factors such as environmental conditions indicating temperature, weather, and/or time of day in determining the adjustments in apparent brightness for each region, as also described in further detail with reference to FIG. 2.

As discussed, the techniques described herein include refinement of machine-generated thermal images using additional information about a scene depicted in the thermal image. In examples, the additional information may include segmentation, object detection and/or object classification, capture metadata, optical flow computation, and the like. In examples, the refined thermal images generated by the process 100 may be used as training data for training ML model(s) to detect objects, determine object types and/or other characteristics of the detected objects e.g., by a perception or prediction system of an autonomous vehicle. Alternatively, or in addition, the refined thermal images may be used by a simulator component to simulate thermal images that may be captured by a vehicle's thermal sensors when traversing a simulated environment. Such simulations may be used to tune parameters of the vehicle systems to respond to cues in the thermal imagery.

The vehicle system(s) trained to perform object detection/ classification in thermal images may consider output of the object detection/classification, in conjunction with images of other sensor modalities, for planning purposes, or to perform other operations to control the vehicle to avoid collision with the detected object(s). Techniques for determining object characteristics in thermal images and controlling the vehicle based on such determination is described in U.S. Pat. No. 11,780,471 issued on Oct. 10, 2023, titled "System for Determining a State of an Object using Thermal Data," which is hereby incorporated herein by reference, as noted above. Example operations to control the vehicle may include, but are not limited to, a safe stop, an emergency stop, determining a trajectory to avoid the object(s), determining a trajectory to avoid a predicted location of the object, and the like. Additional operations based on the presence of the object may include prediction operations e.g., the object may be tracked to determine its trajectory over time. As discussed, using thermal images may provide previously-unavailable characterization of object(s), such as whether an animal is alive, a vehicle has its engine on, a pedestrian is running, and the like. The vehicle computing systems may determine an action for the autonomous vehicle to take based on location, classification, and/or characteristics of the detected object. In some examples, using the techniques described herein may improve safe operation of the vehicle by characterizing the object with greater detail and accuracy as compared to models based on a single modality of images.

In some examples, the techniques discussed herein may reduce time and effort needed to assemble training data needed to train machine learned models for object detection in an image modality different from visible light (e.g., thermal images). Further, such techniques provide for training of ML models based on larger datasets than would otherwise be possible, due to, for example, limited availability of training data, particularly images of multiple modalities of a same scene and images depicting relatively rare events such as various animate and inanimate objects in road scenes.

The techniques described herein can improve a functioning of a computing device by providing a method for generating thermal images usable for training and testing vehicle systems. As discussed, a physics-based generation of thermal images requires complex modeling of thermal emission and absorption characteristics of various materials under different environmental conditions, making it difficult to generate a wide variety of thermal images using physics-based methods. In addition, datasets of thermal images paired with corresponding visible light images are difficult to acquire. The techniques described herein provide an alternative solution for efficiently producing usable thermal images corresponding to real or synthetic visible light images. In addition, the techniques described herein may generate thermal images for use as training data for rare situations (e.g., presence of specific types of animals or vehicles in specific locations in a scene in different types of driving environments) that are often not readily available. In examples, vehicle systems trained to detect objects and determine object characteristics in thermal imagery may be able to detect/classify objects that may be undetected or misclassified based on sensor data of a single modality (e.g., visible light image, depth data, etc.), thus improving safety of vehicle operations. These and other improvements to the functioning of the computer are discussed herein.

Figure 2:
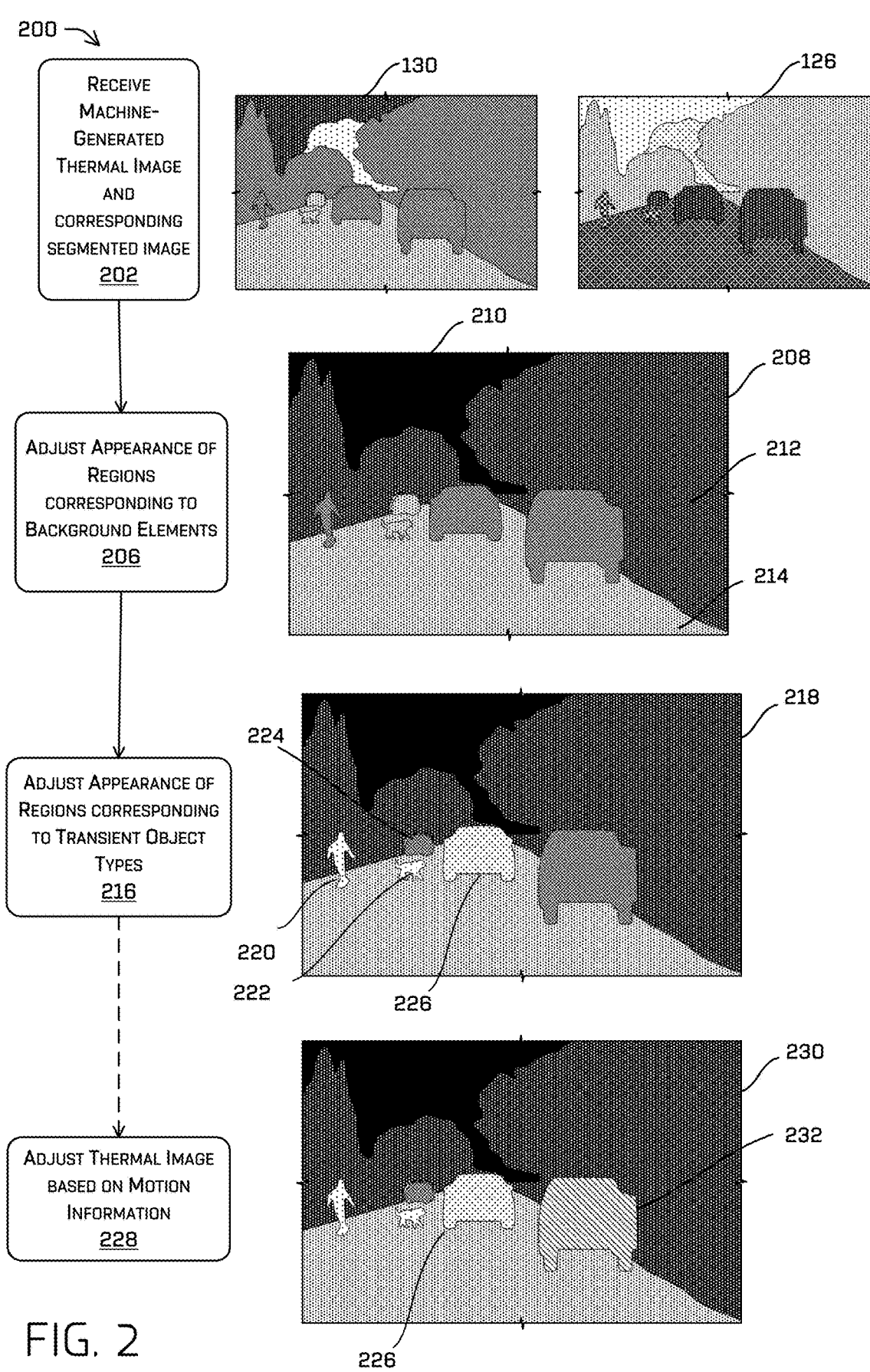
FIG. 2 includes textual and visual flowcharts to illustrate an example method for refining a thermal image by using object-specific thermal characteristics, as described herein.

FIG. 2 includes textual and visual flowcharts to illustrate an example process 200 for refining a machine-generated (or synthetic) thermal image of a scene by using additional information about the scene. The additional information may include a semantic segmentation of the scene, metadata related to capture or synthesis of a visible light image from which the thermal image was generated, motion information from tracked objects in the scene, and the like. The process 200 may be used to improve fidelity of the machine-generated thermal image to a real thermal image of the scene as would be captured by actual infrared sensors. However, the process 200 may be focused on improving fidelity of regions important for controlling operations of an autonomous vehicle traversing the scene, rather than a realistic rendition matching the real thermal image.

At an operation 202, the process 200 includes receiving a machine-generated thermal image (such as the image 130) of a scene and a corresponding segmented image (such as the image 126), both derived from a visible light image (such as the image 104) of the scene. In examples, the thermal image may be a single-channel image with intensity or greyscale values in a range of 0 to N (e.g., N=255, 1023, 4095, etc.). In some examples, the segmented image 126 may also include capture metadata of the underlying visible light image 104, such as capture time and date, geo-location of capture, identification of frame number (if from a video capture), and the like. In some examples, the process 200 may also receive motion information from optic flow within a video capture (e.g., based on determining a change in position of tracked points between frames of the video) from which the visible light image 104 is extracted. Alternatively, or additionally, such motion information may be received from object tracking performed by a vehicle computing system such as a perception system or a prediction system which may use information from other sensor modalities (e.g., instantaneous velocity from radar).

At an operation 206, the process 200 includes adjusting an appearance of regions corresponding to background elements of the scene, such as sky, vegetation, buildings and road surfaces, as illustrated in an example image 208. The background elements of the scene may be identified in the segmented image 126 using semantic segmentation techniques, as discussed with reference to FIG. 1. For example, a region 210 of the example image 208, corresponding to the blobs 106B and 108B in the segmented image 126 labeled as "sky" and "cloud" respectively, may be adjusted to match an expected thermal emittance of the sky as shown e.g., an intensity value of the region 210 may be reduced to appear darker, as the sky is characterized by very low thermal emittance. In some examples, the appearance of the sky may be adjusted further based on an angle of the sun determined from time of day and location indicated in the capture metadata.

As another example, a region 212 of the example image 208, corresponding to the blob 110B identified as "vegetation," may be adjusted to match an expected thermal emittance of vegetation, e.g., a intensity value of the region 212 may be reduced to appear darker, as vegetation is characterized by low thermal emittance. Similarly, a region 214 corresponding to the blob 112B may be adjusted to match an expected thermal emittance associated with the road surface.

In some examples, the process 200 may determine the adjustment in intensity values corresponding to elements of the scene based on environmental conditions. In examples, the process 200 may determine the environmental conditions from metadata associated with the underlying visible light image (such as the image 104). For example, an expected ambient temperature may be determined based on the time of day and date (corresponding to a season) of the year. In some examples, the environmental conditions may be provided as part of the capture metadata at the operation 202 e.g., as determined by sensors on a vehicle capturing the visible light image. Various sensors on the vehicle may be indicative of the environmental conditions at the time of capture of the image 104, such as temperature sensors, humidity sensors, precipitation sensor(s), whether wipers were operational and a speed of such wipers, whether the headlights and/or fog lights of the vehicle were turned on, and the like.

In other examples, the process 200 may determine the environmental conditions based on metadata indicating the time of capture and geo-location of capture. For example, weather conditions such as temperature, humidity, type of precipitation if any, degree of precipitation, whether sunny or cloudy, degree of visibility, or the like, may be available from a weather service for a given time and geo-location at the time of capture. An expected thermal emittance of the road surface, buildings, and vegetation may be determined under various weather conditions by storing such data in a database indexed by specific conditions. Such data may be collected by thermal sensors on a vehicle during vehicle operations under various weather conditions.

For example, colder temperatures and/or snow cover may correspond to lower thermal emittance for road surfaces, vegetation, buildings, parked cars and the like. The process 200 may take into account the ambient temperature in determining an amount of adjustment needed in the intensity values, and under colder environmental conditions, adjust the intensity values to be lower than in normal temperatures. As another example, in heavy rain conditions (e.g., as indicated by fast wiper use and/or headlight use in daytime) a thermal sensor may not be able to correctly measure thermal emittances of surfaces, and therefore, the intensity values may be noisy. In such conditions, the process 200 may introduce, as the adjustment, noise in the intensity values of all surfaces to more accurately simulate the appearance of the elements of the scene under such conditions.

At an operation 216, the process 200 includes adjusting the appearance of regions corresponding to transient object types, such as vehicles, humans, animals, and the like. For example, as shown in an example image 218, an apparent emittance of regions 220, 222 corresponding to semantic labels "human" and "animal" may be boosted to match an expected emittance of living mammals (e.g., the intensity value corresponding to such regions may be increased to make the regions appear brighter). As another example, an emittance level of regions corresponding to "vehicle" classification may be adjusted based on a location of the region with respect to the scene. For example, the process 200 may determine that a region 224, classified as "vehicle," is at an edge of the road surface 214 and therefore, may correspond to a parked vehicle. Based on this determination, the process 200 may lower an emittance of the region 224, as a parked vehicle is usually associated with an engine that has cooled down to ambient temperatures (e.g., the intensity value may be lowered making the region 224 appear darker). Whereas, the process 200 may determine that a region 226, also classified as "vehicle," is located on a lane of the road surface region 214, and therefore, may be associated with a vehicle with a running engine. Since a running engine exhibits high thermal emittance due to its high temperature, the process 200 may adjust the region 226 to appear brighter (e.g., the intensity values in the region 226 may be increased).

In examples where motion information is available, at an operation 228, the process 200 includes adjusting the image 218 further based on the motion information. In an example image 230 shown, the process 200 may determine that a region 232, corresponding to a "vehicle" classification, was associated with a moving object which has just stopped (e.g., was moving within a threshold duration of time before the capture time). Based on this determination, the process 200 may increase the apparent brightness of the region 232 as an engine of the vehicle would not have cooled down. It should be noted that such an indication may be relevant to vehicle operations, as passengers may be exiting a recently stopped vehicle, requiring an autonomous vehicle driving nearby to take appropriate precautions (e.g., maintain a wider distance from the recently stopped vehicle as compared with a parked vehicle). The process 200 may also verify and/or increase the apparent brightness of the region 226 based on an indication that the vehicle in the region 226 is actively moving.

In some examples, the motion information may be used to identify whether the detected object is "alive," e.g., by determining if the object is moving, and based on this determination, the process 200 may increase the apparent brightness of the region corresponding to the object. In some examples, the motion information may also be used to adjust an appearance of portions of the road surface 214. For example, a portion of the road surface where a running vehicle was temporarily stopped (e.g., at a traffic light, at a curbside parking, etc.) may be warmer than remaining portions of the road surface, and the process 200 may increase the apparent brightness for the portion based on a presence of an active vehicle within a threshold period of time.

At the completion of operations of the process 200, the refined thermal image 230 (which may correspond to the image 134 of FIG. 1) may be used as a substitute for an actual thermal image (as captured by thermal sensors in a real environment) in training and simulation of vehicle systems to handle thermal imagery.

FIG. 3 illustrates a block diagram for an example process 300 for generating synthetic thermal images for use as data for training autonomous vehicle systems to interpret thermal imagery and/or as data in a simulated environment for training and testing such vehicle systems, as described herein. The example process 300 may be implemented by any computing system(s), such as computing system(s) implementing the process 100 or the process 200, which may be separate from vehicle computing system(s). The process 300 also includes data augmentation techniques to generate additional thermal images from a synthetic thermal image.

As illustrated in FIG. 3, a visible light image 302 (e.g., a RGB color image) may be provided as input to a generator ML model 304 configured to output a synthetic thermal image 306. In examples, the visible light image 302 may depict a road scene from a point-of-view of a vehicle traversing the roadway in the scene. The image 302 may be captured by a camera mounted on a vehicle, or may be partially or completely synthetic e.g., generated by a generative ML model (not shown).

In examples, the generator ML model 304 may be trained on large datasets of visible light images (e.g., RGB color images) and thermal images, which may be unpaired e.g., depict scenes different from the visible light images, and include other scenes in addition to road scenes. In some examples, the visible light images may be captured by visible light cameras in the real world. In other examples, the visible light images may be partially or completely synthetic (e.g., machine-generated). As non-limiting examples, the generator ML model 304 may comprise a generative adversarial network (GAN), a variational autoencoder (VAE) or an autoregressive model, such as PixelRNN. For example, the generator ML model 304 may comprise a GAN trained using a cycle-based technique that uses feedback 308 from a discriminator ML model 310. In examples, the discriminator ML model 310 may be previously trained to output a determination of whether an input image is a real thermal image (e.g., as captured by thermal sensors in the real world) or a synthetic thermal image (e.g., exhibiting an appearance of a thermal image, but including artifacts that may indicate a synthetic origin). In some examples, the discriminator ML model 310 may output a binary determination (e.g., "yes" or "no") on whether an input image is a real thermal image, along with a confidence score of the binary determination. A training dataset for the discriminator ML model 310 may include a large number of examples of both real thermal images and synthetic thermal images (e.g., machine-generated thermal images) along with ground truth indicating whether the input image is a real or a synthetic thermal image.

In examples, during a training phase, the thermal image 306 output by the generator ML model 304 may be provided as input to the discriminator ML model 310, and the output of the discriminator ML model 310 may be provided as the feedback 308 (as indicated by dotted lines in FIG. 3). Parameters of the generator ML model 304 may be tuned over a large number of instances of thermal images 306 (e.g., outputs corresponding to an input set of visible light images 302) to improve a performance of the generator ML model 304 as indicated by better scores in the feedback 308 e.g., more output thermal images 306 receiving an output of "yes" with a high confidence score from the discriminator ML model 310. In some examples, the generator ML model 304 may be trained to output images of multiple modalities (e.g., thermal, radar, LiDAR, etc.) in response to an input of a single modality (e.g., visible light image).

In some examples, the process 300 may also provide, as inputs to the generator ML model 304, additional information related to the visible light image 302. As non-limiting examples, such inputs may include a segmented image 312 indicating a semantic segmentation of the visible light image 302, as described with reference to the operation 124 of the process 100, and/or environmental conditions 314 (e.g., time of day, temperature, weather condition(s), etc.). In such examples, the generator ML model 304 may be trained on a training dataset that also includes segmented images and/or metadata indicating environmental conditions corresponding to the visible light images of the dataset. In examples where the visible light image is captured by a camera in the real world, the corresponding segmented image may be generated by applying digital image segmentation techniques (e.g., image processing and ML-based methods) on the visible light image, as described with reference to FIG. 1. In other examples, where the visible light image is synthetic, the corresponding segmented image may be generated accurately from underlying 3D model(s) used for generating the synthetic visible light image e.g., locations and shapes of segments in the segmented image can be determined from the 3D model(s) representing the depicted scene using ray-tracing techniques.

In some examples, the generator ML model 304 may comprise a diffusion model (e.g., similar to Stable Diffusion, DALL-E, Fotor, Midjourney, and the like) configured to generate novel images, similar in characteristics to images in its training dataset, in response to input prompts. In such examples, the generator ML model 304 may be trained to accept tokenized input prompts including information in the segmented image 312 and/or the environmental conditions 314, and output the thermal image 306 based on the tokenized input prompts. For example, the segmented image 312 may be provided to the generator ML model 304 as a set of embedding(s), each representing a segment of the segmented image 304. Each segment may also be associated with a position encoding that identifies the position of the segment in the segmented image 312 relative to the other segments. In some examples, the position encoding may be concatenated to the embedding representing the segment.

In some examples, the generator ML model 304 may be trained to output thermal images in response to text prompts and/or representations of objects or scenes. In such examples, the process 300 may provide, as input to the generator ML model 304, the text prompts and/or the representations of the objects in addition to, or instead of, the visible light image 302 and/or associated inputs 312, 314. For example, the generator ML model 304 may receive, as inputs, the visible light image 302 illustrating a scene, and a representation of an object (e.g., a 3D model such as a CAD model, or a 2D visual representation). In response, the generator ML model 304 may output, in the thermal image 306, a depiction of the object in the scene. In such examples, a segment corresponding to the object may be inserted in a known position in the segmented image 312. As another example, text prompts may be used to describe environmental conditions of the scene (e.g., foggy, at sunset, high humidity, etc.), and the generator ML model 304 may be trained to output, in the thermal image 306, the scene depicted in the visible light image 302 under the environmental conditions described in the text prompts e.g., based on a prompt indicating night-time, the generator ML model 304 may output the thermal image 306 depicting the scene in the visible light image 302 as would be captured by a thermal sensor at night. The generator ML model 304, as described herein, may be used to generate thermal images of scenes incorporating various objects and/or under various environmental conditions, that may not be easy to acquire in the real world. In some examples, the generator ML model 304 may be used to generate a thermal image dataset that matches a distribution of types of objects and their corresponding locations matching an expected distribution e.g., a distribution of objects and locations in a sample dataset of real-world images. For example, a design domain that an autonomous vehicle is expected to operate within can be characterized with respect to the distribution of objects. A training or test dataset for use in this domain may be generated using the disclosed techniques for the training or testing to match the intended domain of operation.

Unlike the process 200 described in FIG. 2, in which the additional information is used in refining a machine-generated thermal image as a post-processing step, the process 300 may include providing the additional information to the generator ML model 304 at a time of generation of the output synthetic thermal image 306. In still further implementations, some of the additional information may be provided as inputs to the generator ML model 304 and some other additional information may be used for refining the output of the generator ML model 304. For example, the inputs 312, 314 may be provided to the generator ML model 304 as shown, whereas motion information related to segments in the segmented image 312 may be used to refine the output thermal image 306. As discussed above, the inputs 312, 314 affect an appearance of a thermal image, and the generator ML model 304 may learn adjustments to the output thermal image 306 in response to the additional information in the inputs 312, 314 during the training phase. In examples, the generator ML model 304 may output, associated with the thermal image 306, metadata indicating information in the inputs 312, 314 and/or text prompts.

In some examples, the process 300 may generate additional thermal images to augment a number and variety of thermal images available for training and simulation of vehicle systems. For example, the process 300 may provide the thermal image 306 to variant generator(s) 316 which may be configured to output a set of thermal images 318 based on the input thermal image 306. In some examples, the variant generator(s) 316 may generate the thermal images 318 by applying small modifications (e.g., by adding small rotations, scaling, shifts, mirroring, etc.) to the thermal image 306. In some examples, the small modifications may alternatively, or additionally, include changes in relative emittances of regions in the thermal image 306. As an example, the variant generator(s) 316 may output a first subset of the thermal images 318 by applying different emittance levels (e.g., different apparent brightness) to a region associated with a "vehicle" label in the thermal image 306, the first subset representing vehicles that may be cold (e.g., parked), warm (e.g., recently stopped), or hot (e.g., engine running). As another example, the variant generator(s) 316 may output a second subset of the thermal images 318 by applying different emittance levels to a region associated with a "road surface" label in the thermal image 306, the second subset representing the road surface at different ambient temperatures and weather conditions. For example, a brighter road surface region may correspond to summer temperatures and a darker road surface region may correspond to winter temperatures. Various combinations of emittance levels for different regions in the thermal image 306 are also envisaged.

In some examples, the variant generator(s) 316 may determine multiple viewpoints of the scene depicted in the thermal image 306. As an example, in instances where the visible light image 302 is generated by a simulator in a virtual environment, the simulator may provide a small set of viewpoints of the scene as a set of the visible light images 302. The variant generator(s) 316 may use the corresponding set of output thermal images 306 (e.g., different viewpoints of the same scene) to generate multiple new viewpoints using techniques such as Neural Radiance Field (NeRF).

In some examples, the variant generator(s) 316 may generate the thermal images 318 for only a selection of the thermal images 306. As an example, the variant generator(s) 316 may select the thermal image 306 for generation of the thermal images 318 if a confidence score of being a thermal image, as obtained from the discriminator ML model 310, is higher than a threshold. As another example, the selection of the thermal image 306 may be based on elements of the scene depicted in the thermal image 306. For example, if the thermal image 306 depicts unusual elements (e.g., stroller, moose, emergency vehicle, icy roads/vegetation, etc.), then the variant generator(s) 316 may be more likely to select the thermal image 306 than if the thermal image 306 depicts a typical road scene. In some examples, the variant generator(s) 316 may thermal image 306 for augmentation based on needs of the simulation and/or training systems. For example, if more data is needed under foggy conditions and the thermal image 306 corresponds to foggy conditions, it may be selected for generating the thermal images 318 through augmentation.

Figure 4:
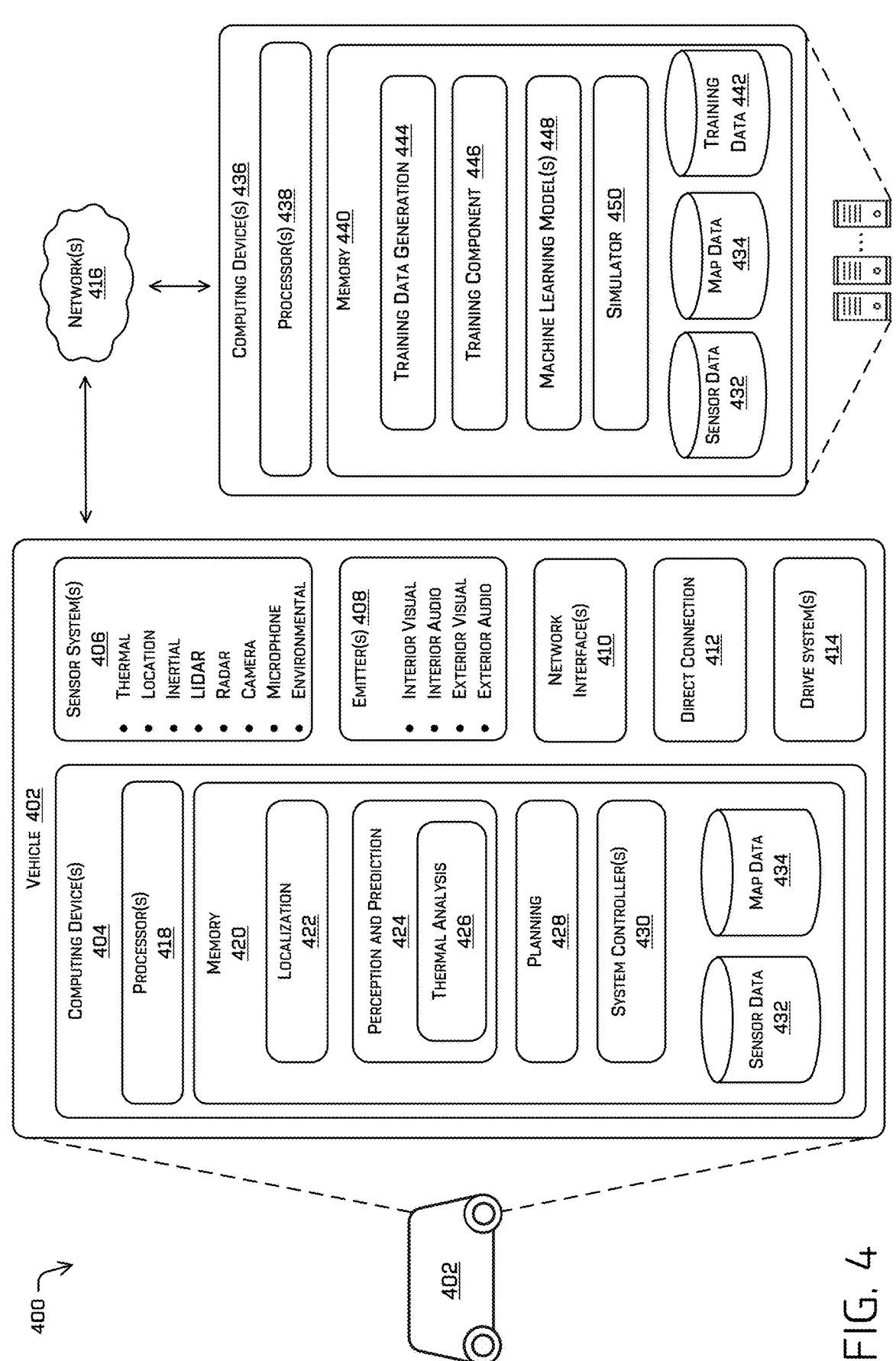
FIG. 4 is a block diagram of an example computing system for implementing the techniques described herein.

FIG. 4 illustrates a block diagram of an example system 400 that implements the techniques discussed herein. As shown, the example system 400 may include a vehicle 402. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well (e.g., vehicles with driver-assist systems).

The vehicle 402 may include computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 may be configured to capture sensor data associated with a surrounding physical environment of the vehicle 402.

In at least some examples, the sensor system(s) 406 may include thermal sensors (e.g., LWIR sensors), time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 806 may include multiple instances of each type of sensor. For instance, time-of-flight sensors may include individual time-of-flight sensors located at the corners, front, back, sides, and/or top of the vehicle 402. As another example, camera sensors may include multiple cameras disposed at various locations about the exterior and/or interior of the vehicle 402. In some cases, the sensor system(s) 406 may provide sensor data as input to the computing device(s) 404.

The vehicle 402 may also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also includes exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 may also include network interface(s) 410 that enable communication between the vehicle 402 and one or more other local or remote computing device(s). For instance, the network interface(s) 410 may facilitate communication with other local computing device(s) on the vehicle 402 and/or the drive system(s) 414. Also, the network interfaces 410 may additionally or alternatively allow the vehicle to communicate with other nearby computing device(s) (e.g., other nearby vehicles, traffic signals, etc.). The network interface(s) 410 may include physical and/or logical interfaces for connecting the vehicle computing device(s) 404 to another computing device or a network, such as network(s) 416. For example, the network interface(s) 410 may enable Wi-Fi-based communication such as via frequencies defined by the IEEE 600.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 404 and/or the sensor system(s) 406 may use the network interface(s) 410 to send sensor data, or other data, via the network(s) 416, to external computing device(s) (e.g., one or more nodes of a cloud computing architecture) at a particular frequency, after a lapse of a predetermined period of time, in near real-time, etc.

In at least one example, the vehicle 402 may include one or more drive system(s) 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which may receive and preprocess data from the sensor system(s) 406 and to control operation of the various vehicle systems. In some examples, the drive system controller can include one or more processor(s) and memory communicatively coupled with the one or more processor(s). The memory can store one or more modules to perform various functionalities of the drive system(s) 414. Furthermore, the drive system(s) 414 also include one or more communication connection(s) that enable communication by the respective drive system with one or more other local or remote computing device(s).

The computing device(s) 404 may include one or more processors 418 and one or more memories 420 communicatively coupled with the processor(s) 418. In the illustrated example, the memory 420 of the computing device(s) 404 stores localization system(s) 422, perception and prediction system(s) 424, which may include a thermal analysis system 426, planning system(s) 428, as well as one or more system controller(s) 430. The memory 420 may also store data such as sensor data 432 captured or collected by the one or more sensors systems 406 and map data 434. Though depicted as residing in the memory 420 for illustrative purposes, it is contemplated that the perception and prediction system(s) 424, the thermal analysis system 426, the planning system(s) 428, as well as the one or more system controller(s) 430 may additionally, or alternatively, be accessible to the computing device(s) 404 (e.g., stored in a different component of vehicle 402) and/or be accessible to the vehicle 402 (e.g., stored remotely).

In examples, the map data 434 may be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the map data 434 can include at least one map (e.g., images and/or a mesh). In some examples, the vehicle 402 can be controlled based at least in part on the map data 434. That is, the map data 434 can be used in connection with the localization system 422, the perception and prediction system 424, and/or the planning system 428 to determine a location of the vehicle 402, identify objects in an environment, generate prediction probability(ies) associated with objects and/or the vehicle 402, and/or generate routes and/or trajectories to navigate within an environment. In some examples, the map data 434 may be stored on a remote computing device(s) accessible via the network(s) 516. In some examples, multiple maps of a same geographic region can be stored in the map data 434 based on, for example, a characteristic (e.g., type of object, time of day, day of week, season of the year, etc.). Storing multiple maps can have similar memory requirements but can increase the speed at which data in a map can be accessed.

In at least one example, the localization system(s) 422 may include hardware and/or software to receive data from the sensor(s) 406 to determine a position, velocity, and/or orientation of the vehicle 402 (e.g., one or more of an x-, y-, z-position, roll, pitch, or yaw). For example, the localization system(s) 422 may include and/or request/receive the map data 434 of an environment and can continuously determine a location, velocity, and/or orientation of the autonomous vehicle within the map data 434. In some instances, the localization system(s) 422 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization system(s) 422 may provide data to various components of the vehicle 402 to determine an initial position of an autonomous vehicle for generating a trajectory and/or for generating map data, as discussed herein. The localization system(s) 422 may also provide a location of the vehicle 402 at a point of capture of sensor data by the sensor system(s) 406, which may be associated with the corresponding sensor data 432 as capture metadata.

The perception and prediction system 424 may be configured to perform object detection, segmentation, and/or classification on the sensor data 432 and/or the map data 434. In some examples, the perception and prediction system 424 may generate processed perception data from the sensor data 432. The perception data may indicate a presence of objects that are in physical proximity to the vehicle 402 and/or a classification or type of the objects (e.g., car, pedestrian, cyclist, building, tree, road surface, curb, sidewalk, unknown, etc.). In some cases, the perception data may be integrated into the map data 434 such as via a semantic layer of a multi-resolution voxel space. In additional and/or alternative examples, the perception and prediction system 424 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, precipitation, etc.

The perception and prediction system 424 may also be configured to determine a predicted behavior and/or state corresponding to an identified object. For example, the perception and prediction system 424 may be configured to predict a velocity, position, change in trajectory, or otherwise predict the decisions and movement of the identified objects. For example, the perception and prediction system 424 may include one or more machine learned models that may, based on inputs such as object type or classification and object characteristics, output predicted characteristics of the object at one or more future points in time. In some cases, the predicted behaviors and/or states may be assigned a confidence value, such that the behaviors and/or states may be sorted, ranked, and/or the like.

Though the thermal analysis system 426 is illustrated as integrated into the perception and prediction system 424, it should be understood that, in some examples, the thermal analysis system 426 may be a separate system from the perception and prediction system 424. In examples, the thermal analysis system 426 may segment and classify thermal sensor data (e.g., a portion of the sensor data 432 of an infrared modality) into segment(s) corresponding to object(s) and determine a respective object type based on respective emittance levels (e.g., heat signatures). In some examples, the thermal analysis system 426 may utilize the segmented and classified sensor data of other modalities (e.g., visible light, LiDAR, radar, etc.) from the perception and prediction system 424 for determining the object type and/or presence of objects in the thermal sensor data. The thermal analysis system 426 may also generate confidence data or values associated with classification and/or predicted behavior of the individual identified objects and/or components of the identified objects. In some cases, the thermal analysis system 426 may determine whether an object is active or alive based on threshold level(s) of thermal emittance.

The planning system 428 may be configured to determine a route for the vehicle 402 to follow to traverse through an environment. For example, the planning system 428 may determine various routes and paths and various levels of detail based at least in part on the identified objects, the predicted behaviors and/or states, characteristics of the object at future times, the confidence value associated with each predicted behavior or state, and a set of safety requirements corresponding to the current scenario (e.g., combination of objects detected and/or environmental conditions). In some instances, the planning system 428 may determine a route to travel from a first location (e.g., a current location) to a second location (e.g., a target location) in order to avoid an object obstructing or blocking a planned path of the vehicle 402. In some case, a route can be a sequence of waypoints for traveling between the two locations (e.g., the first location and the second location). In some cases, waypoints include streets, intersections, global positioning system (GPS) coordinates, etc.

In at least one example, the computing device(s) 404 may store the one or more and/or system controllers 430, which may be configured to control steering, propulsion, braking, safety, emitters, communication, and other systems of the vehicle 402. The system controllers 430 may communicate with and/or control corresponding systems of the drive system(s) 414 and/or other components of the vehicle 402, which may be configured to operate in accordance with a route provided from the planning system 424.

In some examples, the vehicle 402 may connect to computing device(s) 436 via the network(s) 416. For example, the computing device(s) 436 may receive the sensor data 432, perception data, prediction data and/or a combination thereof, from the computing device(s) 404. The computing device(s) 436 may include one or more processors 438 and memory 440 communicatively coupled with the one or more processors 438. In at least one instance, the processor(s) 438 may be similar to the processor(s) 418 and the memory 440 may be similar to the memory 420. In the illustrated example, the memory 440 of the computing device(s) 436 stores the sensor data 432 (including thermal sensor data), the map data 434, and training data 442. The memory 440 may also store a training data generation component 444, and a training component 446 for training machine learning model(s) 448 using the training data 442.

In some examples, the training data generation component 444 may generate some or all of the training data 442 using the sensor data 432, and/or the techniques described herein. For example, the training data generation component 444 may create paired data (e.g., a visible light image and its corresponding thermal image) from the sensor data 432, by aligning the thermal images and the visible light images based on intrinsic and extrinsic parameters of the thermal and visible light sensors of the sensor system(s) 406. The training data generation component 444 may also generate additional thermal images to add to the training data 442 using data augmentation on the real thermal images, as well as generate synthetic thermal images as described herein. The training data generation component 444 may provide additional information related to environmental conditions during capture, as received from the sensor system(s) 406. Additionally, the training data generation component 444 may implement segmentation/classification techniques for generating a semantically segmented image to be added to the training data 442. In some examples, the training data generation component 444 may receive the semantically segmented image from the perception and prediction component 424 along with tracking information for detected object(s).

The training component 446 may then use the training data 442 to train the machine learning (ML) models 448 for use by various vehicle systems. For example, the training component 446 may train ML model(s) for use by the thermal analysis system 426 for segmentation and classification of objects in thermal images. The training component 446 may use learning techniques such as backpropagation to iteratively adjust a set of parameters of the ML models, based on inputs and corresponding expected outputs provided in the training data 442. In some examples, the training component 446 may re-train the ML model(s) 448 periodically and/or when the training data 442 is updated. The training component 446 may also train generative ML model(s) based on the training data 442 to generate synthetic thermal images, as discussed above.

In some examples, an ML model may comprise a neural network. An exemplary neural network is an algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 6 (ID6), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, EfficientNet, PointNet, Xception, and the like or visual transformers (ViTs), such as ConvNeXt.

In some examples, the computing device(s) 436 may also implement a simulator component 450 for training and testing of vehicle systems, such as the thermal analysis system 426, in a simulated environment that includes thermal representations of the environment. In other examples, the simulator component 450 may be implemented on a separate computing device(s) which may or may not be in communication with the vehicle computing device(s) 404.

The processor(s) 418 of the computing device(s) 404 and the processor(s) 438 of the computing device(s) 436 may be any suitable processor capable of executing instructions to process data and perform operations as described herein. By way of example and not limitation, the processor(s) 418 and 438 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 420 of the computing device(s) 404 and the memory 440 of the computing device(s) 436 are examples of non-transitory computer-readable media. The memory 420 and 440 can store an operating system and one or more software applications, instructions, programs, and/or data to implement the methods described herein and the functions attributed to the various systems. In various implementations, the memory 420 and 440 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As described herein, the localization system 422, the perception and prediction system 424, the planning system 428, and/or other components of the system 400 may comprise one or more ML models. For example, the localization system 422, the perception and prediction system 424 and/or the planning system 428 may each comprise different ML model pipelines. As can be understood in the context of this disclosure, a neural network can utilize machine-learning, which can refer to a broad class of such algorithms in which an output is generated based on learned parameters, as described above.

It should be noted that while FIG. 4 is illustrated as a distributed system, in alternative examples, systems of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
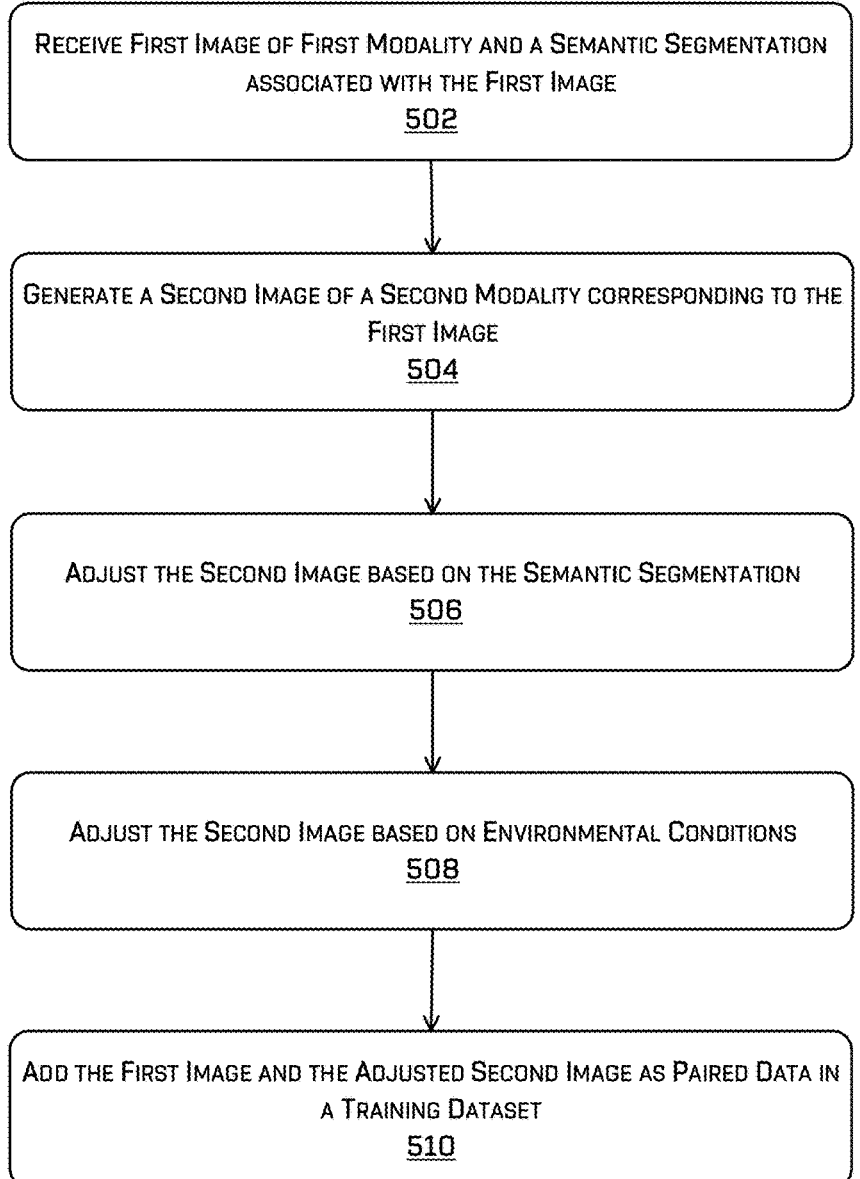
FIG. 5 illustrates an example process for generating training data comprising images of a first modality and corresponding images of a second modality, as described herein.

FIGS. 5 and 6 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 is an example process 500 for generating training data comprising images of a first modality and corresponding images of a second modality, where images of the second modality are not available. In examples, some or all of the process 500 may be performed by one or more components in FIG. 4, as described herein. For example, some or all of the process 500 may be performed by the training data generation component 444.

At an operation 502, the process 500 may include receiving a first image of a first modality and a semantic segmentation associated with the first image. The semantic segmentation may include annotations identifying region(s) corresponding to object(s) in a scene, and additional characteristics of the object(s) such as an object type, tracking information, known properties of the object(s), and the like. For example, the semantic segmentation may include a bounding box, contour, or segment corresponding to the object(s), identification of pixels associated with the object(s), and/or label(s) identifying the object type of the object(s) (e.g., animal, car, pedestrian, cyclist, tree, unknown, etc.). In some examples, the first modality may be a visible light image (e.g., a RGB image), and the semantic segmentation may be auto-generated by a ML model trained to detect and classify objects in a visible light image.

At an operation 504, the process 500 may include generating a second image of a second modality, different from the first modality, corresponding to the first image. For example, the first modality may be a visible light image, and the second modality may be in spectral band(s) at least partially outside the visible light band (e.g., infrared, ultraviolet, multispectral, etc.). In some examples, the second modality may be in the thermal or infrared wavelength bands (e.g., LWIR, SWIR, etc.). In examples, the process 500 may use a generative ML model implementing a neural style transfer (NST) technique to generate the second image. In some examples, the generative ML model may comprise a Cycle-based Neural Style Transfer model (or CycleGAN) trained on unpaired data (e.g., visible light images and thermal images depicting different scenes), or a fully convolutional network (FCN) trained using paired data inputs (e.g., visible light images and corresponding thermal images of the same scene).

At an operation 506, the process 500 may include adjusting the second image based on the semantic segmentation. For example, emittance levels (e.g., apparent brightness or greyscale value) of regions in the second image may be adjusted based on the object type indicated for the respective region in the semantic segmentation. In examples, adjustments may comprise increasing or decreasing intensity values of the regions based on known thermal characteristics corresponding to specific object types. For example, a region associated with an object type "sky" may be adjusted to be darker based on an expected thermal emittance level for sky, and regions corresponding to an object type of "human" or "animal," may be adjusted to be brighter based on an expected thermal emittance level for living mammals.

At an operation 508, the process 500 may include adjusting the second image based on environmental conditions during capture of the first image. In examples, the process 500 may determine the environmental conditions from capture metadata associated with the first image. In examples, the capture metadata may include capture date and time, geo-location, information from other vehicle components at the time of capture, such as outside temperature, wiper use, fog light, headlight or high beam light use, anti-lock braking system (ABS) activation, and the like. The process 500 may adjust the second image based on the environmental conditions indicated in the capture metadata. For example, an appearance of the sky region(s) may be adjusted based on a time of day (corresponding to an angle of the sun) indicated in the capture metadata. As another example, an expected ambient temperature may be determined based on the time of day and date (corresponding to a season) of the year and geo-location, and regions corresponding to road surfaces, vegetation, and parked vehicles may be adjusted based on the expected ambient temperature e.g., adjusted to be darker in colder temperatures and brighter in hotter temperatures. In some examples, the process 500 may adjust the second image to add noise to the greyscale values based on a determination of precipitation or humidity level e.g., from a weather service by providing the date, time and geo-location of capture as inputs. For example, an amount of blurring applied to an image may be proportional to humidity levels. In examples, if the environmental conditions are not available, default adjustments or no adjustments may be applied to the second image.

At an operation 510, the process 500 may include adding the first image and the adjusted second image as paired data in a training dataset. For example, such a paired data may be used for transferring annotations from the semantic segmentation to corresponding regions in the adjusted second image. In some examples, the adjusted second image with annotations may be used for training a classifier (e.g., a ML model) to detect and/or classify objects in images of the second modality (e.g., thermal images).

FIG. 6 is an example process 600 for generating a set of synthetic thermal images associated with a physical environment based on a visible light image representing the physical environment. For example, some or all of the process 600 may be performed by one or more components (e.g., the training data generation component 444) shown in FIG. 4, as described herein. In some examples, the process 600 can represent a process for determining a set of synthetic thermal images similar to the operations performed by the process 300 of FIG. 3.

At an operation 602, the process 600 may include receiving a visible light image and additional information associated a physical environment depicted in the visible light image. In some examples, the additional information may include a segmented image indicating a semantic segmentation of the visible light image, environmental conditions (e.g., time of day, temperature, weather condition(s), etc.), tracking information of blobs in the segmented image (e.g., indicating a speed of motion, a trajectory or path of motion, uniformity of direction and speed, etc.), and the like.

At an operation 604, the process 600 may include inputting the visible light image and at least a portion of the additional information into a trained generative ML model. In examples, the generative ML model may be trained to output a thermal image corresponding to the input visible light image including adjustments to the thermal image based on the additional information provided as input. Such a generative ML model may be trained with a large dataset of thermal imagery captured under various environmental conditions and depicting various object types, both stationary and moving. In non-limiting examples, the generative ML model may comprise a GNN, GAN, autoregressive models, Gaussian mixture models, and the like.

At an operation 606, the process 600 may include receiving, as an output of the generative ML model, a synthetic thermal image associated with the physical environment depicting a same scene as illustrated in the visible light image. In some examples, the generative ML model may produce an output that accounts for differences in appearance of elements of the scene based on the additional information provided as input.

At an operation 608, the process 600 may determine if a confidence value that the synthetic thermal image is of a sufficiently good quality (e.g., for use as a training data point) meets or exceeds a threshold. For example, the process 600 may provide, as an input, the synthetic thermal image to a discriminator ML model trained to determine if an input image is a thermal image. In examples, the discriminator ML model may be configured to output a binary determination of whether the input image is a thermal image ("yes" or "no") along with a confidence value of the determination. If it is determined that the confidence value meets or exceeds a threshold (at 608—Yes), the process 600 may include determining variations of the synthetic thermal image to generate a set of synthetic thermal images at an operation 610. Alternatively, if it is determined that the confidence value does not meet or exceed the threshold (at 608—No), the process 600 may skip further operations and receive the next visible light image at the operation 602.

At the operation 610, the process 600 may generate the set of synthetic thermal images from the synthetic thermal image received at the operation 606 by applying different brightness adjustments to regions in the synthetic thermal image corresponding to objects in the scene. For example, in the set of synthetic thermal images, a region corresponding to a vehicle may have a first level of brightness corresponding to a cold engine (e.g., a parked car), and a second, higher brightness level corresponding to a running car. As another example, a region corresponding to the road surface may have a third level of brightness corresponding to winter temperatures, and a fourth level of brightness corresponding to summer temperatures. Additionally, the process 600 may generate variations of the synthetic thermal image by applying small modifications (e.g., small rotations, scaling, shifts, mirroring, etc.) to the synthetic thermal image.

At an operation 612, the process 600 may include adding the set of synthetic thermal images to a thermal image dataset associated with the physical environment. In some examples, the thermal image dataset may be used by a simulator for simulating an appearance of the physical environment as captured by thermal sensors under various conditions. Such a simulation may be used for training and testing vehicle systems of an autonomous vehicle for interpreting an environment based on thermal imagery. In other examples, the thermal image dataset may be used to train ML models for performing scene interpretation tasks in a thermal modality.

Example Clauses

A: An example system comprising: one or more processors; and one or more non-transitory computer-readable media storing instructions executable by one or more processors, wherein the instructions, when executed, cause the system to perform operations comprising: receiving a visible light image representing an environment, the visible light image including associated metadata; determining, based on segmenting the visible light image, a segmented image including at least one segment characterized by an object type; inputting, to a machine-learning (ML) model trained to output a thermal image corresponding to an input visible light image, the visible light image and the segmented image; and receiving, as output from the ML model and based at least in part on the metadata, a thermal image representing the environment, wherein an intensity value of a portion of the thermal image corresponding to the segment is adjusted based on the object type.

B: The system of example A, wherein the ML model is a first ML model, the operations further comprising: training, based at least in part on the visible light image and the thermal image, a second ML model configured to: receive, from thermal sensors associated with an autonomous vehicle, an input thermal image, and output, to a component of the autonomous vehicle, an indication of the object type.

C: The system of example A or example B, wherein the object type comprises one of: a human, an animal, a vehicle, or a road surface.

D: The system of any one of example A through example C, wherein the metadata is indicative of an environmental condition associated with the visible light image, the environmental condition comprising one of: temperature, humidity, precipitation, or an angle of sun.

E: The system of any one of example A through example D, wherein the object type is a vehicle, the operations further comprising: receiving, from a component of an autonomous vehicle, motion information corresponding to the segment; determining, based on the motion information, an adjustment to be applied to the thermal image, wherein the adjustment comprises: a first adjustment corresponding to a moving vehicle, a second adjustment corresponding to a recently moving vehicle, or a third adjustment corresponding to a stationary vehicle; and determining, based on applying the adjustment to the thermal image, a refined thermal image.

F: The system of any one of example A through example E, wherein the ML model is a generative ML model, the operations further comprising: receiving an input prompt indicative of a characteristic of the environment; and inputting, to the ML model, the input prompt, wherein an appearance of the thermal image is in accordance with the characteristic of the environment.

G: An example method comprising: receiving a first image of a first modality, the first image illustrating a scene and including metadata associated with the scene; determining, by segmenting the first image, a segmented image including at least one segment; inputting, to a machine-learning (ML) model trained to receive an input image of the first modality and generate an output image of a second modality different from the first modality, the first image and the segmented image; and receiving, as output from the ML model, a second image of the scene, the second image being of the second modality, wherein intensity values of the second image are based at least in part on the metadata.

H: The method of example G, wherein the metadata comprises one or more of: date and time information associated with the first image, location information associated with the first image, or an environmental condition associated with the first image.

I: The method of example G or example H, further comprising: determining an object type associated with the at least one segment; determining a portion of the second image corresponding to the at least one segment; determining, based on the object type, an adjustment to be applied to the portion of the second image; and generating, based on applying the adjustment, a refined second image of the second modality, wherein an intensity value of the portion of the second image is based at least in part on the object type.

J: The method of any one of example G through example I, wherein the ML model is a generative ML model, the method further comprising: receiving, a representation of an object including a target location of the object in the first image; and inputting, to the ML model, the representation of the object, wherein the second image includes a region representing the object at a location in the second image corresponding to the target location.

K: The method of any one of example G through example J, wherein the ML model is a generative ML model, the method further comprising: receiving an input prompt indicative of an environmental condition; and inputting, to the ML model, the input prompt, wherein an appearance of the second image is based at least in part on the input prompt.

L: The method of any one of example G through example K, wherein the first modality corresponds to visible light, and the second modality corresponds to an infrared modality.

M: The method of any one of example G through example L, further comprising: generating, by applying an adjustment to the second image, a third image of the second modality; and adding, to a training dataset, the second image and the third image, wherein, in the training dataset, the second image and the third image include an indication of an association with the first image.

N: The method of any one of example G through example M, wherein the ML model is a first ML model, the method further comprising: training, based at least in part on the training dataset, a second ML model configured to: receive, from sensors of the second modality associated with an autonomous vehicle, an input image, and output, to a component of the autonomous vehicle, a segmentation associated with the input image.

O: The method of any one of example G through example N, wherein the ML model: implements a neural style transfer algorithm, and is trained using a training dataset comprising images of the first modality and images of the second modality.

P: An example non-transitory computer-readable medium storing instructions executable by a processor, wherein the instructions, when executed, cause the processor to perform operations comprising: receiving first data captured by a first sensor of a first modality; generating, based on the first data, a segmentation of the first data indicating at least a first region of the first data and an object type associated with the first region; and generating, based on inputting the first data and the segmentation to a machine-learning (ML) model, second data of a second modality, different from the first modality, wherein an appearance of a second region in the second data corresponding to the first region is based at least in part on the object type.

Q: The non-transitory computer-readable medium of example P, wherein the ML model is a first ML model, the operations further comprising: training, based at least in part on the second data, a second ML model configured to detect a region of the object type in an input image of the second modality.

R: The non-transitory computer-readable medium of example P or example Q, wherein the object type comprises one of: a human, an animal, a vehicle, or a road surface.

S: The non-transitory computer-readable medium of example P through example R, wherein the ML model is a generative ML model, the operations further comprising: receiving an input prompt indicative of an environmental condition; and inputting, to the ML model, the input prompt, wherein the appearance of the second region in the second data is further based at least in part on the input prompt.

T: The non-transitory computer-readable medium of example P through example S, wherein: the first data includes metadata indicating environmental conditions during the capture, and the appearance of the second region in the second data is further based at least in part on the metadata.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by one or more processors, wherein the instructions, when executed, cause the system to perform operations comprising:
receiving a visible light image representing an environment;
receiving an input prompt indicative of a characteristic of the environment;
determining, based on segmenting the visible light image, a segmented image including at least one segment characterized by an object type;
inputting, to a machine-learning (ML) model, the visible light image, the input prompt, and the segmented image, wherein the ML model is a generative ML model trained to output a thermal image corresponding to an input visible light image; and
receiving, as output from the ML model and based at least in part on the input prompt, a thermal image representing the environment, wherein;
an intensity value of a portion of the thermal image corresponding to the segment is adjusted based on the object type, and
an appearance of the thermal image is in accordance with the characteristic of the environment.

2. The system of claim 1, wherein the ML model is a first ML model, the operations further comprising:
training, based at least in part on the visible light image and the thermal image, a second ML model configured to:
receive, from thermal sensors associated with an autonomous vehicle, an input thermal image, and
output, to a component of the autonomous vehicle, an indication of the object type.

3. The system of claim 1, wherein the object type comprises one of: a human, an animal, a vehicle, or a road surface.

4. The system of claim 1, wherein the characteristic of the environment comprises at least one of: temperature, humidity, precipitation, or an angle of the sun.

5. The system of claim 1, wherein the object type is a vehicle, the operations further comprising:
receiving, from a component of an autonomous vehicle, motion information corresponding to the segment;
determining, based on the motion information, an adjustment to be applied to the thermal image, wherein the adjustment comprises:
a first adjustment corresponding to a moving vehicle,
a second adjustment corresponding to a recently moving vehicle, or
a third adjustment corresponding to a stationary vehicle; and
determining, based on applying the adjustment to the thermal image, a refined thermal image.

6. A method comprising:
receiving a first image of a first modality, the first image illustrating a scene and including metadata associated with the scene;
receiving an input prompt indicative of an environmental condition associated with the scene;
determining, by segmenting the first image, a segmented image including at least one segment;
inputting, to a machine-learning (ML) model, the first image, the input prompt, and the segmented image, wherein the ML model is a generative ML model trained to receive an input image of the first modality and generate an output image of a second modality different from the first modality; and
receiving, as output from the ML model, a second image of the scene, the second image being of the second modality, wherein:
intensity values of the second image are based at least in part on the metadata, and
an appearance of the second image is based at least in part on the input prompt.

7. The method of claim 6, wherein the metadata comprises one or more of:
date and time information associated with the first image,
location information associated with the first image, or
an environmental condition associated with the first image.

8. The method of claim 6, further comprising:
determining an object type associated with the at least one segment;
determining a portion of the second image corresponding to the at least one segment;
determining, based on the object type, an adjustment to be applied to the portion of the second image; and
generating, based on applying the adjustment, a refined second image of the second modality,
wherein an intensity value of the portion of the second image is based at least in part on the object type.

9. The method of claim 6, further comprising:
receiving, a representation of an object including a target location of the object in the first image; and
inputting, to the ML model, the representation of the object,
wherein the second image includes a region representing the object at a location in the second image corresponding to the target location.

10. The method of claim 6, wherein the first modality corresponds to visible light, and the second modality corresponds to an infrared modality.

11. The method of claim 6, further comprising:
generating, by applying an adjustment to the second image, a third image of the second modality; and
adding, to a training dataset, the second image and the third image,
wherein, in the training dataset, the second image and the third image include an indication of an association with the first image.

12. The method of claim 11, wherein the ML model is a first ML model, the method further comprising:
training, based at least in part on the training dataset, a second ML model configured to:
receive, from sensors of the second modality associated with an autonomous vehicle, an input image, and
output, to a component of the autonomous vehicle, a segmentation associated with the input image.

13. The method of claim 6, wherein the ML model:
implements a neural style transfer algorithm, and
is trained using a training dataset comprising images of the first modality and images of the second modality.

14. A non-transitory computer-readable medium storing instructions executable by a processor, wherein the instructions, when executed, cause the processor to perform operations comprising:
receiving first data captured by a first sensor of a first modality;
receiving an input prompt indicative of an environmental condition;

generating, based on the first data, a segmentation of the first data indicating at least a first region of the first data and an object type associated with the first region; and generating, based on inputting the first data, the input prompt, and the segmentation to a machine-learning (ML) model, second data of a second modality, different from the first modality, wherein an appearance of a second region in the second data corresponding to the first region is based at least in part on the object type and the input prompt.

15. The non-transitory computer-readable medium of claim 14, wherein the ML model is a first ML model, the operations further comprising:

training, based at least in part on the second data, a second ML model configured to detect a region of the object type in an input image of the second modality.

16. The non-transitory computer-readable medium of claim 14, wherein the object type comprises one of: a human, an animal, a vehicle, or a road surface.

17. A method comprising:

receiving a first image of a first modality illustrating a scene and including metadata associated with the scene;

receiving, a representation of an object including a target location of the object in the first image;

inputting, to a machine-learning (ML) model trained to receive an input image of the first modality and generate an output image of a second modality different from the first modality, the first image and the representation of the object; and receiving, as output from the ML model, a second image of the scene, the second image being of the second modality, wherein:

the second image includes a region representing the object at a location in the second image corresponding to the target location, and intensity values of the second image are based at least in part on the metadata.

18. The method of claim 17, wherein the ML model is a generative ML model, the method further comprising:

receiving an input prompt indicative of an environmental condition; and inputting, to the ML model, the input prompt, wherein an appearance of the second image is based at least in part on the input prompt.

19. The method of claim 17, further comprising:

determining, by segmenting the first image, a segmented image including at least one segment;

determining an object type associated with the at least one segment;

determining a portion of the second image corresponding to the at least one segment;

determining, based on the object type, an adjustment to be applied to the portion of the second image; and determining, based on applying the adjustment, a refined second image of the second modality, wherein an intensity value of the portion of the second image is based at least in part on the object type.

20. The method of claim 19, wherein the object type is a vehicle, the method further comprising:

receiving, from a component of an autonomous vehicle, motion information corresponding to the segment; and determining, based on the motion information, an additional adjustment to be applied to the second image, wherein the additional adjustment comprises:

a first adjustment corresponding to a moving vehicle, a second adjustment corresponding to a recently moving vehicle, or a third adjustment corresponding to a stationary vehicle, wherein the refined second image is further determined based on applying the additional adjustment.

* * * * *